US012606663B2

(12) United States Patent
Moroiwa et al.

(10) Patent No.: US 12,606,663 B2
(45) Date of Patent: Apr. 21, 2026

(54) LIQUID COMPOSITION FOR A FIBER REINFORCED PLASTIC INTERMEDIATE BASE MATERIAL, A FIBER REINFORCED PLASTIC INTERMEDIATE BASE MATERIAL, AND A METHOD OF PRODUCING THE FIBER REINFORCED PLASTIC INTERMEDIATE BASE MATERIAL

(71) Applicant: Mitsubishi Gas Chemical Next Company, Inc., Tokyo (JP)

(72) Inventors: Tetsuji Moroiwa, Hiratsuka-city (JP); Nozomi Ishine, Hiratsuka-city (JP); Hiroki Okado, Hiratsuka-city (JP); Katsunori Irie, Hiratsuka-city (JP); Hideaki Furuki, Hiratsuka-city (JP)

(73) Assignee: MITSUBISHI GAS CHEMICAL NEXT COMPANY, INC., Tokyo (JP)

( * ) Notice: Subject to any disclaimer, the term of this patent is extended or adjusted under 35 U.S.C. 154(b) by 929 days.

(21) Appl. No.: 17/429,872

(22) PCT Filed: Feb. 5, 2020

(86) PCT No.: PCT/JP2020/004283
§ 371 (c)(1),
(2) Date: Feb. 3, 2022

(87) PCT Pub. No.: WO2020/166441
PCT Pub. Date: Aug. 20, 2020

(65) Prior Publication Data
US 2022/0169776 A1 Jun. 2, 2022

(30) Foreign Application Priority Data

Feb. 12, 2019 (JP) ................................. 2019-022303
Jan. 20, 2020 (JP) ................................. 2020-006994

(51) Int. Cl.
| | |
|---|---|
| C08G 18/67 | (2006.01) |
| B29C 70/46 | (2006.01) |
| C08G 18/10 | (2006.01) |
| C08G 18/42 | (2006.01) |
| C08G 18/66 | (2006.01) |
| C08J 5/24 | (2006.01) |
| C08L 75/06 | (2006.01) |

(52) U.S. Cl.
CPC .............. *C08G 18/10* (2013.01); *B29C 70/46* (2013.01); *C08G 18/4238* (2013.01); *C08G 18/6611* (2013.01); *C08G 18/672* (2013.01); *C08J 5/243* (2021.05); *C08J 5/249* (2021.05); *C08L 75/06* (2013.01); *C08J 2375/06* (2013.01)

(58) Field of Classification Search
CPC ... C08L 75/06; C08G 18/672; C08G 18/4238; C08G 18/6611
See application file for complete search history.

(56) References Cited

U.S. PATENT DOCUMENTS

| | | | | |
|---|---|---|---|---|
| 5,159,044 A | * | 10/1992 | Bogner | ................... C08L 75/14 |
| | | | | 525/26 |
| 5,851,667 A | * | 12/1998 | Yang | .................... C08G 18/672 |
| | | | | 428/423.1 |
| 6,136,883 A | | 10/2000 | Yang et al. | |
| 2012/0252930 A1 | | 10/2012 | Kobayashi et al. | |
| 2017/0037203 A1 | | 2/2017 | Sun et al. | |
| 2017/0130019 A1 | | 5/2017 | Sun et al. | |

FOREIGN PATENT DOCUMENTS

| | | |
|---|---|---|
| JP | 5-57828 A | 3/1993 |
| JP | 8-259661 A | 10/1996 |
| JP | 2000-313750 A | 11/2000 |
| JP | 2010-70605 A | 4/2010 |
| JP | 2017-513979 A | 6/2017 |
| JP | 2017-519885 A | 7/2017 |
| WO | WO 2011/021516 A1 | 2/2011 |
| WO | WO 2011/092962 A1 | 8/2011 |
| WO | WO 2019/065209 A1 | 4/2019 |

OTHER PUBLICATIONS

Extended European Search Report for European Application No. 20756649.8 dated Sep. 30, 2022.
International Search Report (PCT/ISA/210) issued in PCT/JP2020/004283 mailed on Apr. 28, 2020.
JP Office Action (8 pgs) Dated Dec. 8, 2020 Issued In Priority Application No. JP2020-006994.

* cited by examiner

*Primary Examiner* — Michael L Leonard
(74) *Attorney, Agent, or Firm* — Birch, Stewart, Kolasch & Birch, LLP

(57) ABSTRACT

The objective of the present invention is to provide a liquid composition which is for a fiber reinforced plastic intermediate base material, and which imparts excellent FRP mechanical properties and can suppress voids as much as possible.

The liquid composition for a fiber reinforced plastic intermediate base material according to the present invention is characterized by being obtained by mixing (A) and (B). (A): a composition including a compound (a) having at least two isocyanate groups, and (B): a composition which includes (b1) as an essential component and may include (b2) and (b3).

(b1): a monoalcohol compound having an ethylenically unsaturated group, (b2): a compound having at least two reactive groups with isocyanate groups, and (b3): a polymerization inhibitor.

5 Claims, No Drawings

LIQUID COMPOSITION FOR A FIBER REINFORCED PLASTIC INTERMEDIATE BASE MATERIAL, A FIBER REINFORCED PLASTIC INTERMEDIATE BASE MATERIAL, AND A METHOD OF PRODUCING THE FIBER REINFORCED PLASTIC INTERMEDIATE BASE MATERIAL

TECHNICAL FIELD

The present invention relates to a liquid composition for a fiber reinforced plastic intermediate base material, a fiber reinforced plastic intermediate base material, and a method of producing the fiber reinforced plastic intermediate base material, and, in particular, the liquid composition for a fiber reinforced plastic intermediate base material having particularly excellent curability, a fiber reinforced plastic intermediate base material, and a method of producing the fiber reinforced plastic intermediate base material. Further, in particular, the present invention relates to a liquid composition for a fiber reinforced plastic intermediate base material having particularly excellent impregnation property, a fiber reinforced plastic intermediate base material, and a method for producing the fiber reinforced plastic intermediate base material.

BACKGROUND ART

Fiber reinforced plastic (FRP) is used for various structural members because it is lightweight and has high strength. These fields are diverse, such as housing equipment, automobiles, ships, civil engineering, and sports equipment, but in recent years, the use of FRP has been increasing especially in the fields of automobiles and transportation-related equipment that require weight reduction.

Resin and fiber are used for the production of FRP, and there are two ways of the production of FRP. One is a method of molding using liquid resin and fiber (or woven fabric), the other is a method of using an intermediate base material whose fibers are impregnated with a resin in advance (SMC (Sheet molding compound), prepreg) or a B-stage obtained intermediate base material (SMC (Sheet molding compound), prepreg). As a method of molding using an intermediate base material, there are autoclave molding, sheet winding molding, oven molding, press molding and the like. In these moldings, the intermediate base material is cut, laminated to a target thickness, and cured by applying heat.

On the other hand, urethane (meth) acrylate compounds have been conventionally known to have excellent adhesiveness to carbon fibers, and are used as sizing agents for carbon fibers (for example, Patent literature 1). Further, since the urethane (meth) acrylate compound has good adhesiveness to reinforcing fibers, it has been proposed to use it by mixing it with a resin having poor adhesiveness to reinforcing fibers (for example, Patent literature 2).

Further, for example, a fiber reinforced composite material characterized in that it is constructed by curing an intermediate base material for a fiber reinforced composite material is known (Patent literature 3).

PRIOR ART LITERATURE

Patent Literature

Patent literature 1 JP-A1-H11-200252
Patent literature 2: JP-A1-S62-292839
Patent literature 3 JP-A1-H11-302507

SUMMARY OF INVENTION

Problems to be Resolved by the Invention

However, since the urethane (meth) acrylate compounds described in Patent Documents 1 and 2 described above cannot obtain sufficient mechanical properties when used as a composite material with reinforcing fibers, there was a problem that the molded product having practical mechanical strength could not be obtained.

Further, as the matrix resin of the prepreg sheet, there are epoxy resin, unsaturated polyester resin, vinyl ester resin, phenol resin and the like, but the current situation is that there is no matrix resin that satisfies FRP mechanical properties, curability, surface properties, etc., in a well-balanced manner. For example, a prepreg sheet using epoxy resin as a matrix has excellent mechanical properties, but has problems that it requires a high temperature and a long time for curing and poor storability. And a prepreg sheet using vinyl ester resin and unsaturated polyester resin have excellent curability and storability, but they have a problem of insufficient mechanical properties.

Further, in the conventional method of molding using an intermediate base material, there is a problem that voids in the molded product cannot be completely eliminated. If voids remain in the molded product, they become defective parts and cause a decrease in strength. In order to reduce this void as much as possible, the solution is to reduce the number of laminated layers, that is, to use an intermediate base material having a large unit area weight, but there is a limit to the current manufacturing method. As manufacturing methods of a B-stage obtained intermediate base material, there are methods such as a method of hot-melting a highly viscous semi-solid resin and impregnating the fibers at high temperature, a method of diluting a highly viscous semi-solid resin with a solvent, and impregnating it at room temperature, and removing the solvent subsequently, or a method of adding a thickener to a resin in which an oligomer is dissolved in a reactive diluent and impregnating it at room temperature to chemically thicken it, but those methods have a limit on the unit area weight of the intermediate base material. In the method using a resin in which an oligomer is dissolved in a reactive diluent, the amount of the reactive diluent can be increased to reduce the viscosity at the time of impregnation, but the curing shrinkage becomes large, so that there is a problem that FRP having a high dimensional stability cannot be obtained.

Further, for example, the hot melt method has a problem of impregnation property due to its high viscosity. In the solvent method, since the solvent tends to remain inside when the solvent is removed, voids are often generated during molding, especially in an intermediate base material having a large weight per unit area.

Therefore, an object of the present invention is to provide a liquid composition for a fiber reinforced plastic intermediate base material which can solve the above problems and suppress voids as much as possible and which gives excellent FRP mechanical properties.

Means of Solving the Problems

As a result of various studies on a composition containing at least a radically polymerizable compound from various viewpoints, the present inventor has found a liquid composition for a fiber reinforced plastic intermediate base material of the present invention.

That is, a liquid composition for a fiber reinforced plastic intermediate base material of the present invention is characterized by being made by blending the following (A) and (B):

(A): a composition containing a compound (a) having two or more isocyanate groups, and (B): a composition containing the following (b1) as an essential component, and further being able to contain (b2) and (b3).

(b1): a monoalcoholic compound having an ethylenically unsaturated group (b2): a compound having two or more reactive groups with isocyanate group (b3): a polymerization inhibitor.

Further, in a preferred embodiment of the liquid composition for a fiber reinforced plastic intermediate base material of the present invention, it is characterized in that a polymerization initiator (C) and/or a urethanization catalyst (D) is further blended with the composition (A) or (B).

Further, in a preferred embodiment of the liquid composition for a fiber reinforced plastic intermediate base material of the present invention, it is characterized in that the reactive group with isocyanate group molar ratio (B/A) in the composition (B) to the number of moles of isocyanate groups in the composition (A) is 0.8 to 1.2.

Further, in a preferred embodiment of the liquid composition for a fiber reinforced plastic intermediate base material of the present invention, it is characterized in that the composition (A) or (B) comprises a polymerizable monomer (E) containing no isocyanate reactive group.

Further, in a preferred embodiment of the liquid composition for a fiber reinforced plastic intermediate base material of the present invention, it is characterized in that the content of the polymerizable monomer (E) is 0 to 40% by weight with respect to the total weight of the compositions (A) and (B).

Further, in a preferred embodiment of the liquid composition for a fiber reinforced plastic intermediate base material of the present invention, it is characterized in that the liquid composition, which is a mixture of the compositions (A) and (B), has a viscosity of 5 to 200 mPa·s at 10 to 50° C. measured by a B-type viscometer.

Further, a fiber reinforced plastic intermediate base material of the present invention is characterized in that the fiber reinforced plastic intermediate base material is obtained by impregnating a fiber material with the liquid composition for the fiber reinforced plastic intermediate base material of the present invention.

Further, a method for producing a fiber reinforced plastic intermediate base material is characterized by comprising a step of impregnating the fiber material with the liquid composition of the present invention with an arbitrary composition, and a step of aging the fiber reinforced plastic intermediate base material obtained by impregnating the fiber material.

Further, in a preferred embodiment of the method for producing a fiber reinforced plastic intermediate base material of the present invention, it is characterized in that the aging temperature is 30 to 80° C.

Further, the fiber reinforced composite material of the present invention is characterized in that the fiber reinforced plastic intermediate base material of the present invention is obtained by curing the fiber reinforced plastic intermediate base material of the present invention.

Further, as a result of various studies on the composition for an intermediate base material from various viewpoints, the present inventor has found the liquid composition for a fiber reinforced plastic intermediate base material of the present invention.

That is, a liquid composition for a fiber reinforced plastic intermediate base material of the present invention is characterized by being made by blending the following (A) and (B):

(A): a composition containing a compound (a1) having two or more epoxy groups, and (B): a composition containing the following (b1) as an essential component and further being able to contain (b2).

(b1): a monocarboxylic acid having an unsaturated group (b2): a polymerization inhibitor Further, in a preferred embodiment of the liquid composition for a fiber reinforced plastic intermediate base material of the present invention, it is characterized in that a polymerization initiator (C) and/or an esterification catalyst (D) is/are further blended with the compositions (A) and/or (B).

Further, in a preferred embodiment of the liquid composition for a fiber reinforced plastic intermediate base material of the present invention, it is characterized in that a molar ratio (B/A) of epoxy reactive groups in the composition (B) to the number of moles of epoxy groups in the composition (A) is 0.8 to 1.2.

Further, in a preferred embodiment of the liquid composition for a fiber reinforced plastic intermediate base material of the present invention, it is characterized in that the composition (A) and/or (B) comprises a polymerizable monomer (E) containing no epoxy-reactive group.

Further, in a preferred embodiment of the liquid composition for a fiber reinforced plastic intermediate base material of the present invention, it is characterized in that the content of the polymerizable monomer (E) is 0 to 40% by weight with respect to the total weight of the compositions (A) and (B).

Further, the fiber reinforced plastic intermediate base material of the present invention is characterized in that the fiber reinforced plastic intermediate base material is obtained by impregnating a fiber material with the liquid composition of the present invention.

Further, a method for producing a fiber reinforced plastic intermediate base material of the present invention is characterized by comprising a step of impregnating a fiber material with an arbitrary composition of the liquid composition of the present invention, and a step of aging the fiber reinforced plastic intermediate base material obtained by the impregnation.

Further, in a preferred embodiment of the method for producing a fiber reinforced plastic intermediate base material of the present invention, it is characterized in that the aging temperature is 30 to 90° C.

Further, a fiber reinforced composite material of the present invention is characterized in that the fiber reinforced composite material is obtained by curing the reinforced plastic intermediate base material of the present invention.

Effect of Invention

According to the liquid composition for a fiber reinforced plastic intermediate base material of the present invention, it has the advantageous effect that it is possible to provide an intermediate base material having small shrinkage during curing, excellent dimensional stability, and an excellent impregnation property into the base material.

Further, according to the present invention, it has an advantageous effect that it is possible to provide a highly reliable composite material having almost no voids or unimpregnated portions, and excellent mechanical characteristics. Further, the intermediate base material of the present invention also has an advantageous effect of being excellent in curability and storability.

Further, according to the present invention, the present invention using a liquid composition having a low viscosity and excellent impregnation property has an advantageous effect that an intermediate base material having a large unit area weight can be produced. Further, according to the present invention, it has an advantageous effect that it is possible to provide a high-strength FRP with as few voids as possible by reducing the number of laminations and an FRP having excellent dimensional stability with respect to an intermediate base material having a large unit area weight,

MODE FOR CARRYING OUT THE INVENTION

Embodiments of the present invention will be described in detail below, but the present invention is not limited to the following description as long as the gist of the present invention is not exceeded. In the present invention, "(meth) acrylate" means "acrylate" and "methacrylate". Similarly, "(meth) acrylic acid ester" means "acrylic acid ester" and "methacrylic acid ester".

First, the liquid composition for a fiber reinforced plastic intermediate base material of the present invention, which comprises a composition containing a compound (a) having two or more isocyanate groups, will be described with an example.

That is, a liquid composition for a fiber reinforced plastic intermediate base material of the present invention is characterized by being made by blending the following (A) and (B):

(A): a composition containing a compound (a) having two or more isocyanate groups, and (B): a composition containing the following (b1) as an essential component, and further being able to contain (b2) and (b3).

(b1): a monoalcoholic compound having an ethylenically unsaturated group (b2): a compound having two or more reactive groups with isocyanate group (b3): a polymerization inhibitor.

First, the composition (A) will be described. The composition (A) is a composition containing a compound (a) having two or more isocyanate groups.

As the compound (a) having two or more isocyanate groups applicable to the present invention, for example, mention may be made of aromatic isocyanate compounds such as 1,3-xylene diisocyanate, 2,4-tolylene diisocyanate, 2,6-tolylene diisocyanate, 4,4'-diphenyldiisocyanate, 1,5-naphthalenediocyanate, 4,4'-diphenylmethane diisocyanate, polymethylenepolyphenylpolyisocyanate, m-tetramethylxylene diisocyanate etc., alicyclic isocyanate compounds such as hydrogenated xylylene diisocyanate (1,3-bis (isocyanatomethyl) cyclohexane), isophorone diisocyanate, norbornene diisocyanate, dicyclohexylmethane diisocyanate, hydrogenated methylene bisphenylenediocyanate, 1,4-cyclohexanediisocyanate etc., aliphatic isocyanate compounds such as 1,6-hexamethylene diisocyanate, trimethylene diisocyanate etc., trifunctional isocyanate having an isocyanurate ring in which a bifunctional isocyanate compound is trimerized, and isocyanate prepolymer modified with a polyol, etc. These isocyanate compounds may be used alone or in combination of two or more. Among these, an aliphatic isocyanate compound is particularly preferable from the viewpoint of viscosity and reactivity. For example, mention may be made of prepolymers having a isocyanate group obtained by reacting isophorone diisocyanate or isophorone diisocyanate with a compound (b2) having two or more isocyanate reactive groups in excess of an isocyanate group.

When aromatic isocyanates such as 2,4-tolylene diisocyanate, 2,6-tolylene diisocyanate, and 4,4'-diphenylmethane diisocyanate are used, the compound (b2) having two or more isocyanate reactive group to be blended in the composition (B) is preferably a compound having a secondary or tertiary hydroxyl group. As the compound having a secondary or tertiary hydroxyl group, mention may be made of propylene glycol, dipropylene glycol, a prepolymer using alcohols thereof, and a polyester polyol. When an aromatic isocyanate is used, if an alcohol or amino compound having a primary hydroxyl group is used for all the compounds (b2) having two or more isocyanate reactive groups in the composition (B), there are possibilities that the rate of the thickening after mixing is too fast to obtain an intermediate base material having a large unit area weight sufficiently impregnated with the liquid composition.

If the thickening speed is too fast after mixing the compositions (A) and (B), it is also possible to manufacture an intermediate base material under the conditions without a urethanization catalyst (D) to suppress the reaction, or under the low temperature conditions such that the viscosity of the liquid composition does not exceed the range.

Next, the composition (B) will be described. The composition (B) may be a composition capable of containing an ethylenically unsaturated group containing monoalcohol compound (b1), a compound having two or more isocyanate reactive groups (b2), and a polymerization inhibitor (b3) in an arbitrary ratio. The composition (B) can contain a monoalcohol compound having an ethylenically unsaturated group (b1) as an essential component, and a compound (b2) having two or more reactive groups with isocyanate group and a polymerization inhibitor (b3) can be optionally added to the composition (B). Although the monoalcohol compound having an ethylenically unsaturated group (b1) and the compound (b2) having two or more reactive groups with isocyanate group contained in the composition (B) may be preferably liquid at the impregnation temperature (in a range of 10 to 50° C. and an arbitrary temperature), a solid material may be used as the composition (B) as long as it becomes the liquid composition.

The monoalcohol compound having ethylenically unsaturated group (b1) is a (meth) acrylic acid ester having a hydroxyl group. As the monoalcohol compound having ethylenically unsaturated group (b1), mention may be made of 2-hydroxyethyl (meth) acrylate, 2-hydroxypropyl (meth) acrylate, 4-hydroxybutyl (meth) acrylate, polyethylene glycol mono (meth) acrylate, polypropylene glycol mono (meth) acrylate, trimethylpropandi (meth) acrylate, glycidyl (meth) acrylate, pentaerythritol tri (meth) acrylate, dipentaerythritol penta (meth) acrylate, diacrylicized isocyanurate, 2-hydroxy-3-phenoxypropyl (meth) acrylate, 2-acryloyloxyethyl hexahydrophthalic acid, 2-acryloyloxyethyl-2-hydroxyethyl-phthalic acid, etc.

These monoalcohol compounds having ethylenically unsaturated group (b1) can be used alone or in combination of two or more. Moreover, among these monoalcohol compounds having ethylenically unsaturated group (b1), 2-hydroxyethyl (meth) acrylate, 2-hydroxypropyl (meth) acrylate, 4-hydroxybutyl (meth) acrylate is preferred, from the viewpoint of the viscosity of the liquid composition and the mechanical properties of the cured product. If heat resistance is required, pentaerythritol tri (meth) acrylate is preferable.

As the compound (b2) having two or more reactive groups with isocyanate group, mention may be made of aliphatic alcohols, etherified diphenols, polyester polyols, and amino group containing compounds and the like.

As the aliphatic alcohol, mention may be made of ethylene glycol, 1,2-propanediol, 1,3-propanediol, 1,2-butanediol, 1,3-butanediol, 1,4-butanediol, 2,3-butanediol, 1,4-butenediol, 2-methyl-1,3-propanediol, 1,5-pentanediol, neopentyl glycol, 2-ethyl-2-methylpropane-1,3-diol, 2-butyl-2-ethylpropane-1,3-diol, 1,6-hexanediol, 3-methyl-1,5-pentanediol, 2-ethyl-1,3-hexanediol, 2,4-dimethyl-1,5-pentanediol, 2,2,4-trimethyl-1,3-pentanediol, 1,7-heptanediol, 1,8-octanediol, 1,9-nonanediol, 1,10-decanediol, diethylene glycol, triethylene glycol, dipropylene glycol, polypropylene glycol, polyethylene glycol, glycerin, trimethylolethane, trimethylolpropane, pentaerythritol and the like. As the cyclic aliphatic alcohol, mention may be made of hydrogenated bisphenol A, tricyclodecanedimethanol, spiroglycol and the like. Among these, from the viewpoint of the viscosity and thickening of the liquid composition and the mechanical properties of the cured product, ethylene glycol, 1,2-propanediol, 1,3-propanediol, 1,2-butanediol, 1,3-butanediol, 1,4-butanediol, 2,3-butanediol, 1,5-pentanediol, 1,6-hexanediol, tricyclodecanedimethanol, and trimethylolpropane are preferably used.

As the etherified diphenol, mention may be made of a diol obtained by addition reaction of bisphenol A and alkylene oxide, a diol obtained by bromination of an adduct of bisphenol A and alkylene oxide, and the like. As the alkylene oxide, mention may be made of ethylene oxide or propylene oxide, and the average addition molar number of the alkylene oxide is preferably 2 to 16 mol with respect to 1 mol of bisphenol A.

As the polyester polyol, mention may be made of those obtained by polycondensing an unsaturated and/or saturated acid with the above-mentioned aliphatic alcohol and etherified diphenol. As unsaturated acids, mention may be made of maleic anhydride, maleic acid, and fumaric acid. As saturated acids, mention may be made of orthophthalic acid, terephthalic acid, isophthalic acid, 1,4-cyclohexanedicarboxylic acid, adipic acid, succinic acid, sebacic acid, alkylsuccinic acid, alkenylsuccinic acid, itaconic acid, biphenyldicarboxylic acid, naphthalenedicarboxylic acid, 5-tert-butyl-1,3-benzenedicarboxylic acids and acid anhydrides thereof, and ester-forming derivatives such as lower alkyl esters and acid halides. From the viewpoint of resin viscosity and mechanical properties of the cured product, polyester polyols obtained by polycondensation of one or more selected from terephthalic acid, isophthalic acid, orthophthalic acid and ester-forming derivatives thereof, with one or more selected from ethylene glycol, 1,2-propanediol, and 1,3-propanediol, 1,2-butanediol, 1,3-butanediol, 1,4-butanediol, 2,3-butanediol, 1,5-pentanediol, 1,6-hexanediol, tricyclodecanedimethanol, trimethylolpropane are particularly preferred.

As the amino group containing compound, mention may be made of alkanolamines and polyamines. As alkanolamine, mention may be made of di- and tri-alkanolamines having 2 to 20 carbon atoms (carbon numbers), and as specific examples thereof, mention may be made of diethanolamine, triethanolamine and isopropanolamine. As polyamine, mention may be made of alkylenediamine having 2 to 6 carbon atoms and polyalkylene polyamine having 4 to 20 carbon atoms as the aliphatic amine. Specifically, as the polyamine, mention may be made of ethylenediamine, propylenediamine and hexamethylenediamine, and dialkylenetriamine to hexaalkyleneheptamine having 2 to 6 carbon atoms in the alkylene group, such as diethylenetriamine and triethylenetetramine and the like. Further, as an aromatic polyamine having 6 to 20 carbon atoms, mention may be made of phenylenediamine, tolylene diamine, xylylene diamine, diethyltoluenediamine, methylenedianiline and diphenyletherdiamine, and as an alicyclic polyamine having 4 to 20 carbon atoms, mention may be made of isophoronediamine, cyclohexylene diamine and dicyclohexylmethanediamine, and as heterocyclic polyamines having 4 to 20 carbon atoms, mention may be made of piperazine and aminoethyl piperazine and the like.

Further, it is also possible to blend a polymer or an oligomer having an isocyanate reactive group within the viscosity range of the liquid composition. For example, vinyl ester obtained by reacting an epoxy group containing compound with (meth) acrylate, a hydroxyl group containing acrylic polymer, and the like can be mentioned.

As the compound (b2) having two or more isocyanate reactive groups, the aliphatic alcohol, the etherified diphenol, the polyester polyol, and the amino group containing compound can be used alone or in combination of two or more.

As the polymerization inhibitor (b3), for example, known polyhydric phenolic polymerization inhibitors such as hydroquinone, parabenzoquinone, methylhydroquinone, trimethylhydroquinone, and toluhydroquinone can be used.

Further, in a preferred embodiment of the liquid composition for a fiber reinforced plastic intermediate base material of the present invention, it is characterized in that a polymerization initiator (C) and/or a urethanization catalyst (D) is further blended with the composition (A) or (B).

Further, in a preferred embodiment of the liquid composition for a fiber reinforced plastic intermediate base material of the present invention, it is characterized in that the composition (A) or (B) comprises a polymerizable monomer (E) having no reactive group with isocyanate group.

First, a polymerization initiator (C), a urethanization catalyst (D), and an isocyanate-free polymerizable monomer (E) will be described. Each of these components can be blended into either the composition (A) or (B). The polymerization initiator (C) can be an essential component when the intermediate base material is cured by radical polymerization in the fiber reinforced composite material described later.

The urethanization catalyst (D) and the isocyanate-free polymerizable monomer (E) can be blended if necessary.

As the polymerization initiator (C), mention may be made of organic peroxides, such as ketone peroxide series such as methyl ethyl ketone peroxide and acetylacetone peroxide, diacyl peroxide series such as benzoyl peroxide, peroxyester series such as t-butyl peroxybenzoate, hydroperoxide series such as cumene hydroperoxide, dialkyl peroxide series such as dicumyl peroxide, and peroxydicarbonate series such as bis (4-terrary butyroylhexyl) peroxydicarbonate, etc.

Further, when imparting photocurability to the intermediate base material (substrate), an initiator for photocuring can be used, for example, mention may be made of an acetophenone series such as acetophenone, p-dimethylaminoacetophenone, p-dimethylaminopropiophenone, etc. aminobenzophenone series such as α-alkylaminobenzophenone, benzophenone series such as benzophenone and 2-chlorobenzophenone, benzoin ether series such as benzoin methyl ether, benzyl ketal series such as benzyl dimethyl ketal, anthraquinone series such as 2-ethylanthraquinone, octamethyl anthraquinone, organic peroxides such as cumempaoxide, thiol compounds such as 2-mercaptobenzo-imidazole, and o-acyloxym series such as acetophenone o-benzoyloxime.

These can be appropriately selected from the aging temperature, molding temperature, and storage temperature of the intermediate base material, and can be used alone or in combination of two or more.

The amount of the polymerization initiator (C) added is 0.05 to 5 parts by weight with respect to 100 parts by weight of the liquid composition. The polymerization initiator (C) can be blended in the composition (B), but since the composition (B) contains a compound having an ethylenically unsaturated group, considering the storage stability of the composition (B), it is preferable to blend it with the composition (A).

An acidic catalyst or a basic catalyst can be used as the urethanization catalyst (D), but tin compounds such as dibutyltin dilaurate and dibutyltin diacetate having high activity are preferable. The amount of the catalyst added depends on the other raw materials selected, but from the viewpoints of heat generation during aging, rate of urethane acrylate formation, storage stability of the intermediate base material, and mechanical properties of the cured product, the amount of the catalyst added is 0-800 ppm with respect to the weight of the liquid composition.

The polymerizable monomer (E) having no reactive group with isocyanate group is preferably one that does not react with the isocyanate group at room temperature. As the polymerizable monomer (E) that does not react with the isocyanate group at room temperature, mention may be made of a vinyl monomer, monofunctional (meth) acrylic acid ester and polyfunctional (meth) acrylic acid ester. If a polymerizable monomer that reacts with an isocyanate group is blended, there is a risk that the viscosity will increase due to the reaction during storage, resulting in poor workability or insufficient mechanical properties.

As the vinyl monomer, mention may be made of styrene, vinyltoluene, α-methylstyrene, vinyl acetate and the like, and as the monofunctional (meth) acrylic acid ester, mention may be made of methyl methacrylate, benzyl (meth) acrylate, n-butyl (meth) acrylate, i-butyl (meth) acrylate, t-butyl (meth) acrylate, 2-ethylhexyl (meth) acrylate, tetrahydrofurfuryl (meth) acrylate, lauryl (meth) acrylate, tridecyl (meth) acrylate, stearyl (meth) acrylate, 2-methoxyethyl (meth) acrylate, 2-ethoxyethyl (meth) acrylate, cyclohexyl (meth) acrylate, isobornyl (meth) acrylate, norbornyl (meth) acrylate, dicyclopentenyl (meth) acrylate, dicyclopentenyloxyethyl (meth) acrylate, etc., and as the polyfunctional (meth) acrylic acid ester, mention may be made of ethylene glycol di (meth) acrylate, triethylene glycol di (meth) acrylate, 1,3-propanediol di (meth) acrylate, 1,4-butanediol di (meth) acrylate, neopentyl glycol di (meth) acrylate, diethylene glycol di (meth) acrylate, tripropylene di (meth) acrylate, norbornene dimethanol di (meth) acrylate, tricyclodecanedimethanol di (meth) acrylate, ethylene oxide-added bisphenol A di (meth) acrylate, propylene oxide-added bisphenol A di (meth) acrylate, trimethylpropantri (meth) acrylate, and tris (2-(meth) acryloyloxyethyl) isocyanurate and the like. These polymerizable monomers (E) can be used alone or in combination of two or more. From the viewpoint of tackiness and odor as an intermediate base material and mechanical properties of the cured product, it is preferable to apply diethylene glycol di (meth) acrylate, triethylene glycol di (meth) acrylate, tripropylene di (meth) acrylate, benzyl methacrylate, dicyclopentenyl (meth) acrylate, ethylene oxide-added bisphenol A di (meth) acrylate, tricyclodecanedimethanol di (meth) acrylate, and propylene oxide-added bisphenol A di (meth) acrylate.

Further, in a preferred embodiment of the liquid composition for a fiber reinforced plastic intermediate base material of the present invention, it is characterized in that the content of the polymerizable monomer (E) is 0 to 40% by weight with respect to the total weight of the compositions (A) and (B). That is, the blending amount of the polymerizable monomer (E) can be adjusted within the range of 0 to 40% by weight in the liquid composition in accordance with the urethane acrylate obtained by aging, with respect to the viscosity characteristics and tackiness targeted as the intermediate base material. From the viewpoint of reducing the curing shrinkage of the intermediate base material, 0 to 20% by weight is preferable.

Further, in a preferred embodiment of the liquid composition for a fiber reinforced plastic intermediate base material of the present invention, from the viewpoint of imparting excellent FRP mechanical properties to it, it is further characterized in that the isocyanate reactive group molar ratio (B/A) in the composition (B) to the number of moles of isocyanate groups in the composition (A) is 0.8 to 1.2, preferably 0.9 to 1.1.

Further, in a preferred embodiment of the liquid composition for a fiber reinforced plastic intermediate base material of the present invention, it is characterized in that the liquid composition, which is a mixture of the compositions (A) and (B), has a viscosity of 5 to 200 mPa·s at 10 to 50° C. measured by a B-type viscometer. That is, the viscosity of the liquid composition of the present invention is preferably 5 to 200 mPa·s at 10 to 50° C. at the time when the compositions (A) and (B) are mixed, and although it depends on the unit area weight of the target intermediate base material, 5 to 100 mPa·s is particularly preferable. If the viscosity exceeds 200 mPa·s, impregnation into a base material having a large unit area weight becomes poor, and an unimpregnated portion is formed, which is not preferable.

The liquid composition of the present invention changes to urethane (meth) acrylate by aging, and the ethylenically unsaturated group equivalent of the urethane acrylate is, not particularly limited, but is preferably less than 1000 g/eq. If it is 1000 g/eq or more, the balance of mechanical properties (flexural strength, tensile strength, compressive strength, interlayer shear strength) becomes poor, and there is a possibility that the heat resistance of the molded product may be lowered.

The liquid composition of the present invention may contain inorganic particles or rubber particles for the purpose of adjusting viscoelasticity and improving mechanical properties. Examples of the inorganic particles can include, but are not limited to, calcium carbonate, alumina, talc, titanium oxide, silica and the like. The rubber component is not particularly limited, and examples thereof can include crosslinked rubber particles and core-shell rubber particles in which the rubber component is wrapped in a crosslinked polymer. The blending amount thereof depends on the viscosity of the liquid resin composition, but is 2 to 80% by weight, preferably 2 to 75% by weight.

Further, carbon nanotubes can be added to the liquid composition of the present invention in order to further improve the mechanical strength and impact resistance of FRP. The carbon nanotubes are preferably single-walled carbon nanotubes from the viewpoint of the viscosity and coatability of the liquid composition, and the blending amount thereof may be preferably 0.05 to 0.5% by weight of the single-walled carbon nanotubes in the FRP.

Further, a low shrinkage agent, an internal mold release agent, a component dispersant and the like can be added to the liquid composition of the present invention, if necessary. These formulations are preferably liquid from the viewpoint of solubility, but may be solid as long as they are dissolved in the liquid composition by applying heat.

Further, a fiber reinforced plastic intermediate base material of the present invention is characterized in that the fiber reinforced plastic intermediate base material is obtained by impregnating a fiber material with the liquid composition for the fiber reinforced plastic intermediate base material of the present invention. Further, the fiber reinforced plastic intermediate base material of the present invention is characterized in that the fiber material is impregnated with the liquid composition for the fiber reinforced plastic intermediate base material of the present invention.

Examples of the fiber used for the intermediate base material of the present invention may include, but are not limited to, carbon fiber, glass fiber, aramid fiber, zylon fiber, boron fiber, basalt fiber, and cellulose. The reinforcing fiber content is preferably 10 to 90% by weight, preferably 30 to 80% by weight from the viewpoint of mechanical properties and moldability. There is no limitation on the surface treatment agent and shape (unidirectional, cloth, NCF, non-woven fabric, etc.) of the reinforcing fiber. It is also possible to sandwich the core material between the fiber base material and the fiber base material. As the core material, mention may be made of foamed non-woven fabric and honeycomb core mat.

Further, a method for producing a fiber reinforced plastic intermediate base material is characterized by comprising a step of impregnating the fiber material with the liquid composition of the present invention with an arbitrary composition, and a step of aging the fiber reinforced plastic intermediate base material obtained by impregnating the fiber material. In the present invention, the liquid composition is not particularly limited, but can be impregnated into the fiber material with an arbitrary composition at a temperature of, for example, 10 to 60° C. Further, in the present invention, if necessary, the fiber material may be further sandwiched between films and the fiber material may be impregnated with the liquid composition by roller pressure to form a roll or a binding. Then, the fiber reinforced plastic intermediate base material obtained by impregnation can be aged. That is, in the present invention, urethane acrylate can be formed in a state where the liquid composition is impregnated in the fiber or the woven fabric during the aging. In the past, urethane acrylate was once formed and then impregnated into fibers and the like. Surprisingly, the present inventors have found that the liquid composition of the present invention is aged in a state of being impregnated with fibers or woven fabrics, and a urethane acrylate is formed through the aging process. This makes it possible to bond the liquid composition and the fiber more firmly in the present invention. As will be clear from the examples described later, the present invention has the advantageous effect of being able to exhibit better impregnation, curability, mechanical properties and the like.

In a preferred embodiment of the method for producing a fiber reinforced plastic intermediate base material of the present invention, it is characterized in that the aging temperature is 30 to, 80° C., from the viewpoint of promoting urethane acrylate formation and suppressing the radical polymerization reaction. In this way, the liquid composition can be coated on a film, the fibers or the woven fabric can be placed on the coated surface, the fibers or the woven fabric can be further sandwiched between another films, and pressure can be applied by a roller to impregnate the fibers or the woven fabric with the liquid composition. Moreover, it is preferable to have a breakwater-shaped jig in order to maintain a constant width of the coated material until the coated material comes into contact with the fiber or the woven fabric from the coating site. Alternatively, the liquid composition can be dropped or sprayed onto the fiber or woven fabric, further sandwiched between films, and pressure can be applied by a roller to impregnate the fiber or woven fabric with the liquid composition. Those impregnated by these methods can be rolled or spliced and aged in a furnace (30 to 80° C.).

Further, the fiber reinforced composite material of the present invention is characterized in that the fiber reinforced composite material of the present invention is obtained by curing the fiber reinforced plastic intermediate base material of the present invention.

The cured product of the intermediate base material of the present invention in which urethane acrylate is formed on fibers can be obtained by heat-curing by applying heat and pressure. That is, it is possible to perform curing by radical polymerization. Molding methods that apply heat and pressure include autoclave molding, oven molding, sheet winding molding, press molding, and the like. Although it depends on the type of the polymerization initiator in the liquid composition, the molding temperature is preferably 70 to 180° C., preferably 100 to 150° C., and the molding time is preferably 3 to 60 minutes, and the molding pressure is preferably 0.1 to 10 MPa.

Next, the liquid composition for a fiber reinforced plastic intermediate base material of the present invention, which comprises a composition containing a compound (a1) having two or more epoxy groups in another aspect of the present invention, will be described with an example.

Hereinafter, embodiments of another aspect of the present invention will be described in detail, but the present invention is not limited to the following description as long as the gist of the present invention is not exceeded. In the present invention, "(meth) acrylate" means "acrylate" and "methacrylate". Similarly, "(meth) acrylic acid" indicates "acrylic acid" and "methacrylic acid".

A liquid composition for a fiber reinforced plastic intermediate base material of the present invention is characterized by being made by blending the following (A) and (B):

(A): a composition containing a compound (a1) having two or more epoxy groups, and (B): a composition containing the following (b1) as an essential component and further being able to contain (b2).

(b1): a monocarboxylic acid having an unsaturated group (b2): a polymerization inhibitor First, the composition (A) will be described. The composition (A) is a composition containing a compound (a1) having two or more epoxy groups. As the compound (a1) having two or more epoxy groups applicable to the present invention, mention may be made of polyglycidyl ether obtained by reacting polyphenols such as bisphenol A, bisphenol F, bisphenol AD, catechol, resorcinol, or polyhydric alcohols such as glycerin and polyethylene glycol with epichlorohydrin, glycidyl ether ester obtained by reacting hydroxycarboxylic acids such as p-hydroxybenzoic acid, β-hydroxynaphthoic acid with epichlorohydrin, polyglycidyl ester obtained by reacting a polycarboxylic acid such as phthalic acid, terephthalic acid with epichlorohydrin, as well as epoxidized phenol novolac, epoxidized cresol novolac, epoxidized polyolefin, cyclic aliphatic epoxy, and other urethane modified epoxy and the like, but are not limited to examples thereof. These compounds having an epoxy group can be used alone or in combination of two or more.

Among these, as the compound (a1) having an epoxy group, from the viewpoint of maintaining high heat resistance and low moisture permeability, at least one selected from the group consisting of a bisphenol A type epoxy resin, a bisphenol F type epoxy resin, a phenol novolac type epoxy resin, a biphenyl aralkyl type epoxy resin, a phenol aralkyl type epoxy resin, an aromatic glycidylamine type epoxy resin, and an epoxy resin having a dicyclopentadiene structure is preferable. Moreover, the epoxy resin may be liquid or solid, and both liquid resin and solid resin may be used.

The epoxy equivalent of the epoxy resin is, for example, 50 to 1000 g/eq, preferably 100 to 500 g/eq, and more preferably 100 to 300 g/eq.

Next, the composition (B) will be described. The composition (B) is a composition containing a monocarboxylic acid having an unsaturated group (b1) and a polymerization inhibitor (b2) in an arbitrary ratio. The composition (B) contains a monocarboxylic acid having an unsaturated group (b1) as an essential component, and a polymerization inhibitor (b2) is added as necessary. The monocarboxylic acid having unsaturated group (b1) blended in the composition (B) is preferably liquid. The monocarboxylic acid having unsaturated group (b1) is a (meth) acrylic acid having an unsaturated group, and for example, mention may be made of a reaction product of a monocarboxylic acid such as (meth) acrylic acid, crotonic acid, silicic acid, and sorbic acid, for example, a dibasic acid anhydride, with an alcohol having at least one unsaturated group in the molecule. As the dibasic acid anhydride, mention may be made of maleic anhydride, succinic anhydride, phthalic anhydride, tetrahydrophthalic anhydride, hexahydrophthalic anhydride and the like. These monocarboxylic acids having unsaturated group (b1) can be used alone or in combination of two or more. Among these monocarboxylic acids having unsaturated group (b1), monocarboxylic acid is preferable, (meth) acrylic acid is more preferable, and methacrylic acid is further preferable, from the viewpoint of the viscosity of the liquid composition and the mechanical properties of the cured product.

As the polymerization inhibitor (b2), for example, known polyhydric phenolic series polymerization inhibitors such as hydroquinone, parabenzoquinone, methylhydroquinone, and trimethylhydroquinone and the like can be used.

Next, the polymerization initiator (C), the esterification catalyst (D), and the polymerizable monomer (E) having no reactive group with epoxy group will be described. Each of these components can be blended into either the composition (A) or (B). The polymerization initiator (C), the esterification catalyst (D), and the polymerizable monomer (E) having no reactive group with epoxy group are blended as necessary.

Further, in a preferred embodiment of the liquid composition for a fiber reinforced plastic intermediate base material of the present invention, it is characterized in that a polymerization initiator (C) and/or an esterification catalyst (D) is/are further blended with the compositions (A) and/or (B).

As the polymerization initiator (C), mention may be made of organic peroxides series, for example, such as ketone peroxides series such as methyl ethyl ketone peroxide and acetylacetone peroxide, diacyl peroxides series such as benzoyl peroxide, peroxyester series such as t-butyl peroxybenzoate, hydroperoxide series such as cumene hydroperoxide, dialkyl peroxide series such as dicumyl peroxide, peroxydicarbonate series such as bis (4-tertiary butyroylhexyl) peroxydicarbonate, etc.

Further, when imparting photocurability to the intermediate base material, an initiator for photocuring can be used, for example, mention may be made of an acetophenone series such as acetophenone, p-dimethylaminoacetophenone, p-dimethylaminopropiophenone, aminobenzophenone series such as α-alkylaminobenzophenone, benzophenone series such as benzophenone, 2-chlorobenzophenone, benzoin ether series such as benzoin methyl ether, benzyl ketal series such as benzyl dimethyl ketal, anthraquinone series such as 2-ethylanthraquinone, octamethyl anthraquinone, organic peroxides such as cumene peroxide, thiol compounds such as 2-mercaptobenzoimidal, and o-acyloxym series such as acetophenone o-benzoyloxime.

These can be appropriately selected from the aging temperature, molding temperature, and storage temperature of the intermediate base material, and can be used alone or in combination of two or more. The addition amount of the polymerization initiator (C) is 0.05 to 5 parts by weight with respect to 100 parts by weight of the total liquid composition of the components (A)+(B) from the viewpoint of obtaining good curability. The polymerization initiator (C) can be blended in the composition (B), but since the composition (B) contains a compound having an unsaturated group containing monocarboxylic acid, it can be used as the composition (B), in consideration of the storage stability of the above, it is preferable to add it to the composition (A).

Moreover, it is preferable to use a known catalyst as the esterification catalyst (D). Examples of such a catalyst can include tertiary amines such as triethylamine and dimethylbenzylamine, quaternary ammonium salts, imidazole derivatives such as imidazole and 2-methylimidazole, organic phosphorus compounds such as triphenylphosphine, and organic antimony compounds such as triphenylantimon. These catalysts can be used in the range of 0.01 to 10 parts by weight with respect to a total of 100 parts by weight of the compound (a1) having at least two or more epoxy groups in one molecule and the unsaturated group containing monocarboxylic acid (b1), from the viewpoint of realizing that the intermediate substrate is sufficiently aged.

Further, in a preferred embodiment of the liquid composition for a fiber reinforced plastic intermediate base material of the present invention, from the viewpoint of obtaining good mechanical strength, it is characterized in that a molar ratio (B/A) of reactive groups with epoxy group in the composition (B) to the number of moles of epoxy groups in the composition (A) is 0.8 to 1.2.

Further, in a preferred embodiment of the liquid composition for a fiber reinforced plastic intermediate base material of the present invention, it is characterized in that the composition (A) and/or (B) comprises a polymerizable monomer (E) having no reactive group with epoxy group. The polymerizable monomer (E) containing no epoxy-reactive group is preferably one that does not react with the epoxy group at room temperature, and mention may be made of a vinyl monomer, a monofunctional (meth) acrylic acid ester, or a polyfunctional (meth) acrylic acid ester. If a polymerizable monomer that reacts with an epoxy group is blended, there is a possibility that the viscosity will increase due to the reaction during storage, resulting in poor workability or insufficient mechanical properties.

As the vinyl monomer, mention may be made of styrene, vinyl toluene, α-methylstyrene, vinyl acetate and the like, and as the monofunctional (meth) acrylic acid ester, mention may be made of methyl methacrylate, benzyl (meth) acrylate, n-butyl (meth) acrylate, i-butyl (meth) acrylate, t-butyl (meth) acrylate, 2-ethylhexyl (meth) acrylate, tetrahydrofurfuryl (meth) acrylate, lauryl (meth) acrylate, tridecyl (meth) acrylate, stearyl (meth) acrylate, 2-methoxyethyl (meth) acrylate, 2-ethoxyethyl (meth) acrylate, cyclohexyl (meth) acrylate, isobornyl (meth) acrylate, norbornyl (meth) acrylate, dicyclopentenyl (meth) acrylate, dicyclopentenyl oxyethyl (meth) acrylate, and as the polyfunctional (meth) acrylic acid ester, mention may be made of ethylene glycol di (meth) acrylate, triethylene glycol di (meth) acrylate, 1,3-propanediol di (meth) acrylate, 1,4-butanediol di (meth) acrylate, neopentyl glycol di (meth) acrylate, diethylene glycol di (meth) acrylate, tripropylene di (meth) acrylate, norbornene dimethanol di (meth) acrylate, tricyclodecanedimethanol di (meth) acrylate, ethylene oxide-added bisphenol A di (meth) acrylate, propylene oxide-added bisphenol A di (meth) acrylate, trimethylolpropane tri (meth) acrylate, tris (2-(meth) acryloyloxyethyl) isocyanurate and the like. These polymerizable monomers (E) can be used alone or in combination of two or more. From the viewpoint of tackiness and odor of an intermediate base material and mechanical properties of its cured product, it is preferable to apply diethylene glycol di (meth) acrylate, triethylene glycol di (meth) acrylate, tripropylene di (meth) acrylate, benzyl methacrylate, dicyclopentenyl (meth) acrylate, ethylene oxide-added bisphenol A di (meth) acrylate, tricyclodecanedimethanol di (meth) acrylate, propylene oxide-added bisphenol A di (meth) acrylate.

Further, in a preferred embodiment of the liquid composition for a fiber reinforced plastic intermediate base material of the present invention, it is characterized in that the content of the polymerizable monomer (E) is 0 to 40% by weight with respect to the total weight of the compositions (A) and (B). That is, the blending amount of the polymerizable monomer (E) can be adjusted in the range of 0 to 40% by weight in the liquid composition according to the epoxy (meth) acrylate obtained by aging with respect to the target viscosity characteristics and tackiness as the intermediate base material. From the viewpoint of reducing the curing shrinkage of the intermediate base material, 0 to 30% by weight is preferable.

The viscosity of the liquid composition of the present invention is preferably 0.1 Pa·s to 5 Pa·s at 25 to 80° C., when the compositions (A) and (B) are mixed. If the viscosity exceeds 5 Pa·s, there is a possibility that the base material may be poorly impregnated depending on the conditions and an unimpregnated part will be formed, which is not preferable.

The liquid composition of the present invention changes to an epoxy (meth) acrylate by aging, and the ethylenically unsaturated group equivalent of the epoxy (meth) acrylate is not particularly limited, but is preferably less than 1000 g/eq. If it is 1000 g/eq or more, there is a possibility that the balance of mechanical properties (flexural strength, tensile strength, compressive strength, interlayer shear strength) becomes poor, and the heat resistance of the molded product may be lowered.

In the present invention, since it changes to epoxy (meth) acrylate, it is possible to provide a molded product having excellent chemical resistance by adding the type of chemicals which give chemical resistance to the molded product. These chemicals are not particularly limited, and examples thereof can include water, chemicals (acids, alkalis, etc.), and solvents (ethanol, etc.). These have different chemical resistance depending on the concentration and temperature.

The liquid composition of the present invention may contain inorganic particles or rubber particles for the purpose of adjusting viscoelasticity and improving mechanical properties. Examples of the inorganic particles can include, but are not limited to, calcium carbonate, alumina, talc, titanium oxide, silica and the like. The rubber component is not particularly limited, and examples thereof can include crosslinked rubber particles and core-shell rubber particles in which the rubber component is wrapped in a crosslinked polymer.

Further, carbon nanotubes can be added to the liquid composition of the present invention in order to further improve the mechanical strength and impact resistance of FRP.

Further, a low shrinkage agent, an internal mold release agent, a component dispersant and the like can be added to the liquid composition of the present invention as needed. These additives are preferably liquid from the viewpoint of solubility, but may be solid as long as they are dissolved in the composition by applying heat.

Further, the fiber reinforced plastic intermediate base material of the present invention is characterized in that the fiber reinforced plastic intermediate base material is obtained by impregnating a fiber material with the liquid composition of the present invention.

Examples of the fiber used for the intermediate base material of the present invention can include, but are not limited to, carbon fiber, glass fiber, aramid fiber, zylon fiber, boron fiber, basalt fiber, and cellulose. In addition, the rate of the reinforcing fiber content is preferably 10 to 90% by weight, preferably 30 to 80% by weight from the viewpoint of mechanical properties and moldability. The surface treatment agent and shape (unidirectional, cloth, NCF, non-woven fabric, etc.) of the reinforcing fiber are not limited. Moreover, it is also possible to sandwich the core material between the fiber base material and the fiber base material. As the core material, mention may be made of foamed non-woven fabric, honeycomb core mat and the like.

Further, a method for producing a fiber reinforced plastic intermediate base material of the present invention is characterized by comprising a step of impregnating a fiber material with an arbitrary composition of the liquid composition of the present invention, and a step of aging the fiber reinforced plastic intermediate base material obtained by the impregnation. In the present invention, the liquid composition can be impregnated into the fiber material with an arbitrary composition at a temperature of, for example, 10 to 60° C., although not particularly limited. Further, in the present invention, if necessary, the fiber material may be further sandwiched between films and the fiber material may be impregnated with the liquid composition by roller pressure to form a roll or a binding. Then, the fiber reinforced plastic intermediate base material obtained by impregnation can be aged. That is, in the present invention, it is possible to form an epoxy acrylate in a state where the liquid composition is impregnated in the fiber or the woven fabric during the aging. In the past, epoxy acrylate was once formed and then impregnated into fibers and the like. Surprisingly, the present inventors have found that the liquid composition of the present invention is aged in a state of being impregnated with fibers or woven fabrics, and an epoxy acrylate is formed through the aging process. This makes it possible to bond the liquid composition and the fiber more firmly in the present invention, and as will be clear from the examples described later, it has an advantageous effect that it can exhibit better impregnation, curability, mechanical properties and the like.

In a preferred embodiment, the aging temperature can be 30 to 90° C., from the viewpoint of promoting epoxy acrylate formation and suppressing the radical polymerization reaction. First, the liquid composition can be coated on a film, the fibers or woven fabric can be placed on the coated surface, sandwiched between the films, and pressure can be applied by a roller to impregnate the fibers or woven fabric with the liquid composition. Moreover, it is preferable to have a breakwater-shaped jig in order to maintain a constant width of the coated material from the coating site until the coated material comes into contact with the fiber or the woven fabric. Alternatively, the liquid composition can be dropped or sprayed onto the fiber or woven fabric, further sandwiched between films, and pressure can be applied by a roller to impregnate the fiber or woven fabric with the liquid composition. Those impregnated by these methods can be rolled or spliced and aged in a furnace (30 to 90° C.).

Further, a fiber reinforced composite material of the present invention is characterized in that the fiber reinforced composite material is obtained by curing the reinforced plastic intermediate base material of the present invention.

The cured product of the intermediate base material of the present invention can be obtained by heat-curing by applying heat and pressure. Molding methods that apply heat and pressure include autoclave molding, oven molding, sheet winding molding, press molding, and the like. Although it depends on the type of the polymerization initiator in the liquid composition, the molding temperature is preferably 70 to 180° C., preferably 100 to 150° C., and the molding time is preferably 3 to 60 minutes, and the molding pressure is preferably 1 to 15 MPa.

EXAMPLE

Hereinafter, first, regarding the liquid composition for a fiber reinforced plastic intermediate base material of the present invention, which comprises a composition containing a compound (a) having two or more isocyanate groups, one embodiment of the present invention will be described in more detail by way of examples. As described above, the present invention is not limited to these examples. In this embodiment, "parts" are parts by weight unless otherwise specified. In the examples, prepreg and C-SMC (carbon SMC (Sheet Molding Compound)) were prepared as examples of the intermediate base material.

Synthesis Example

Synthesis of Compound (b2) Having Two or More Isocyanate Reactive Groups 1
(Synthesis of Polyester Polyol 1)

582.6 parts of phthalic anhydride and 488.3 parts of ethylene glycol were charged in a five-necked flask equipped with a thermometer, a stirrer, a gas introduction tube, and a reflux condenser. And under nitrogen flow (0.5 L/min), the mixture was gradually heated to 210° C., over 5 hours with stirring, and when it reached 210° C., a polycondensation reaction was carried out for 6 hours. When the acid value of the reaction solution became 5 mgKOH/g or less, the reaction was terminated to obtain polyester polyol 1.

Synthesis of Compound (b2) Having Two or More Isocyanate Reactive Groups 2
(Synthesis of Polyester Polyol 2)

533.9 parts of terephthalic acid, 635.9 parts of neopentyl glycol, and 61.8 parts of tripropylene glycol were charged in a five-necked flask equipped with a thermometer, a stirrer (an agitator), a gas introduction tube, and a reflux condenser. And nitrogen flow was performed (0.5 L/min), the mixture was gradually heated to 240° C., over 14 hours with stirring, and when it reached 240° C., a polycondensation reaction was carried out for 3 hours. When the acid value of the reaction solution became 5 mgKOH/g or less, the reaction was terminated to obtain polyester polyol 2.

Synthesis of Compound (b2) Having Two or More Isocyanate Reactive Groups 3
(Synthesis of Polyester Polyol 3)

524.7 parts of phthalic anhydride and 539.1 parts of propylene glycol were charged in a five-necked flask equipped with a thermometer, a stirrer, a gas introduction tube, and a reflux condenser. Under nitrogen flow (0.5 L/min), the mixture was gradually heated to 210° C., over 7 hours with stirring, and when it reached 210° C., a polycondensation reaction was carried out for 6 hours. When the acid value of the reaction solution became 5 mgKOH/g or less, the reaction was terminated to obtain a polyester polyol 3.

Comparative Synthesis Example 1

(Synthesis of Urethane (Meth) Acrylate (UA-1))

550.2 parts of isophorone diisocyanate (manufactured by Evonik Japan Co., Ltd.), 391.7 parts of the above polyester polyol 2, 379.3 parts of 2-hydroxypropyl methacrylate (Kyoei Co., Ltd. Light Ester HOP (N)), 163.4 parts of diethylene glycol dimethacrylate (manufactured by Shin-Nakamura Chemical Co., Ltd., NK Ester 2G), 0.1 parts of toluhydroquinone, 0.4 part of 4-Methyl-2,6-di-tert-butylphenol and 0.2 part of dibutyltin dilaurate were charged in a five-necked flask equipped with a thermometer, a stirrer, a gas introduction tube, and a reflux condenser, and reacted under dry air (0.2 L/min) at a temperature of 108 to 112° C. The reaction was followed by IR, and the end point was defined as the point where the absorption of isocyanate groups (around 2270 cm$^{-1}$) became constant. The reaction took 3 hours. (The ratio of the number of moles of isocyanate reactive groups to the number of moles of isocyanate groups in the liquid composition is 0.94, the theoretical ethylenically unsaturated group equivalent of urethane (meth) acrylate formed after aging is 502 g/eq, and the viscosity is approximately 12 Pa·s at 80° C.).

Comparative Synthesis Example 2

(Synthesis of Epoxy (Meth) Acrylate Resin (EA-1))

689.9 parts of bisphenol A type epoxy compound (JER "#1001"), 127.6 parts of methacrylic acid, 1.6 parts of 2-methylimidazole, 0.8 parts of monomethyl ether hydroquinone were charged in a five-necked flask equipped with a thermometer, a stirrer, a gas introduction tube and a reflux condenser, and kept under air flow (0.2 L/min) and at a temperature of 110 to 120° C., and reacted for 10 hours. Then, it was diluted with 180.0 parts of diethylene glycol dimethacrylate (NK ester 2G, manufactured by Shin Nakamura Chemical Industry Co., Ltd.) to obtain an epoxy acrylate resin having an acid value of 2.4 mg/KOH.

[Preparation of Liquid Composition]

Composition A and composition B were prepared, respectively.

<Preparation of Composition A>

Preparation of Liquid Composition A (x-1) (for Preparation of Composition (c-1) used in Examples 1 and 11)

975.6 parts of isophorone diisocyanate (manufactured by Evonik Japan Co., Ltd.) and 24.4 parts of perbutyl E (monooxycarbonate-based organic peroxide manufactured by NOF Corporation) were blended in a container. And the mixture was stirred at room temperature until a uniform solution was obtained to obtain a composition (x-1).

Preparation of Liquid Composition A (x-2) (for Preparation of Composition (c-2) Used in Examples 2 and 12)

977.5 parts of isophorone diisocyanate (manufactured by Evonik Japan Co., Ltd.) and 22.5 parts of perbutyl E (monooxycarbonate organic peroxide manufactured by NOF Corporation) were blended in a container. And the mixture was stirred at room temperature until a uniform solution was obtained to obtain a composition (x-2).

Preparation of Liquid Composition A (x-3) (for Preparation of Composition (c-3) Used in Example 3)

973.5 parts of isophorone diisocyanate (manufactured by Evonik Japan Co., Ltd.) and 26.5 parts of perbutyl E (monooxycarbonate organic peroxide manufactured by NOF Corporation) were blended in a container. And the mixture was stirred at room temperature until a uniform solution was obtained to obtain a composition (x-3).

Preparation of Liquid Composition A (x-4) (for Preparation of Composition (c-4) Used in Examples 4 and 13)

978.5 parts of 4,4'-diphenylmethane diisocyanate (Cosmonate LL manufactured by Mitsui Chemicals, Inc.) and 21.5 parts of Perbutyl E (monooxycarbonate-based organic peroxide manufactured by NOF Corporation) were blended in a container. The mixture was stirred at room temperature until a uniform solution was obtained to obtain a composition A (x-4).

Preparation of Liquid Composition A (x-5) (for Preparation of Composition (c-5) Used in Examples 5 and 14)

974.6 parts of isophorone diisocyanate (manufactured by Evonik Japan Co., Ltd.) and 25.4 parts of perbutyl E (monooxycarbonate-based organic peroxide manufactured by NOF Corporation) were blended in a container. The mixture was stirred at room temperature until a uniform solution was obtained to obtain a composition (x-5).

Preparation of Liquid Composition A (x-6) (for Preparation of Composition (c-6) Used in Examples 6 and 15)

973.0 parts of isophorone diisocyanate (manufactured by Evonik Japan Co., Ltd.) and 27.0 parts of perbutyl E (monooxycarbonate organic peroxide manufactured by NOF Corporation) were blended in a container. And the mixture was stirred at room temperature until a uniform solution was obtained to obtain a composition (x-6).

Preparation of Liquid Composition A (x-7) (for Preparation of Composition (c-7) Used in Examples 7 and 16)

980.1 parts of isophorone diisocyanate (manufactured by Evonik Japan Co., Ltd.) and 19.9 parts of perbutyl E (monooxycarbonate organic peroxide manufactured by NOF Corporation) were blended in a container, and the mixture was stirred at room temperature until a uniform solution was obtained to obtain a composition (x-7).

Preparation of Liquid Composition A (x-8) (for Preparation of Composition (c-8) Used in Examples 8 and 17)

971.8 parts of isophorone diisocyanate (manufactured by Evonik Japan Co., Ltd.) and 28.2 parts of perbutyl E (monooxycarbonate organic peroxide manufactured by NOF Corporation) were blended in a container, and the mixture was stirred at room temperature until a uniform solution was obtained to obtain a composition (x-8).

Preparation of Liquid Composition A (x-9) (for Preparation of Composition (c-9) Used in Examples 9 and 18)

972.2 parts of isophorone diisocyanate (manufactured by Evonik Japan Co., Ltd.) and 27.8 parts of perbutyl E (monooxycarbonate-based organic peroxide manufactured by NOF Corporation) were blended in a container, and the mixture was stirred at room temperature until a uniform solution was obtained to obtain a composition (x-9).

Preparation of Liquid Composition A (x-10) (for Preparation of Composition (c-10) Used in Examples 10 and 19)

981.1 parts of isophorone diisocyanate (manufactured by Evonik Japan Co., Ltd.) and 18.9 parts of perbutyl E (monooxycarbonate organic peroxide manufactured by NOF Corporation) were blended in a container, and the mixture was stirred at room temperature until a uniform solution was obtained to obtain a composition (x-10).

<Preparation of Composition B>

Preparation of Liquid Composition B (y-1) (for Preparation of Composition (c-1) Used in Examples 1 and 11)

409.8 parts of the polyester polyol 1, 437.7 parts of 2-hydroxypropyl methacrylate (light ester HOP (N) manufactured by Kyoei Co., Ltd.), 151.0 parts of diethylene glycol dimethacrylate (NK ester 2G manufactured by Shin Nakamura Chemical Industry Co., Ltd.), 0.1 part of toluhydroquinone, 0.5 part of 4-methyl-2,6-di-tert-butylphenol, and 0.9 part of dibutyltin dilaurate were blended in a container, and the mixture was stirred until a uniform solution was obtained to obtain a composition B (y-1).

Preparation of Liquid Composition B (y-2) (for Preparation of Composition (c-2) Used in Examples 2 and 12)

201.0 parts of the polyester polyol 1, 58.0 parts of trimethylolpropane (manufactured by Mitsubishi Gas Chemical Company, Inc.), 579.4 parts of 2-hydroxypropyl methacrylate (light ester HOP (N) manufactured by Kyoei Co., Ltd.), 160.1 parts of diethylene glycol dimethacrylate (NK ester 2G manufactured by Shin Nakamura Chemical Industry Co., Ltd.), 0.1 parts of toluhydroquinone, 0.5 parts of 4-methyl-2,6-di-tert-butylphenol, 0.9 parts of dibutyltin dilaurate were blended in a container and the mixture was stirred while heating until a uniform solution was obtained. Then, it cooled to room temperature to obtain composition B (y-2).

Preparation of Liquid Composition B (y-3) (for Preparation of Composition (c-3) Used in Example 3)

418.9 parts of the polyester polyol 2, 405.6 parts of 2-hydroxypropyl methacrylate (light ester HOP (N) manufactured by Kyoei Co., Ltd.), 174.7 parts of diethylene glycol dimethacrylate (NK ester 2G manufactured by Shin Nakamura Chemical Industry Co., Ltd.), 0.1 part of toluhydroquinone, 0.4 part of 4-methyl-2,6-di-tert-butylphenol, and 0.2 part of dibutyltin dilaurate were blended in a container, and the mixture was stirred while heating until a uniform solution was obtained. Then, it cooled to room temperature to obtain composition B (y-3).

Preparation of Liquid Composition B (y-4) (for Preparation of Composition (c-4) Used in Examples 4 and 13)

230.2 parts of the polyester polyol 3, 602.7 parts of 2-hydroxypropyl methacrylate (light ester HOP (N) manufactured by Kyoei Co., Ltd.), 166.5 parts of diethylene glycol dimethacrylate (NK ester 2G manufactured by Shin Nakamura Chemical Industry Co., Ltd.), 0.1 part of toluhydroquinone and 0.5 part of 4-methyl-2,6-di-tert-butylphenol were blended in a container and the mixture was stirred until a uniform solution was obtained to obtain composition B (y-4).

Preparation of Liquid Composition B (y-5) (for Preparation of Composition (c-5) Used in Examples 5 and 14)

422.7 parts of the polyester polyol 1, 428.8 parts of 2-hydroxypropyl methacrylate (light ester HOP (N) manufactured by Kyoei Co., Ltd.), 147.0 parts of diethylene glycol dimethacrylate (NK ester 2G manufactured by Shin Nakamura Chemical Industry Co., Ltd.), 0.1 part of toluhydroquinone, 0.4 part of 4-methyl-2,6-di-tert-butylphenol, and 0.9 part of dibutyltin dilaurate were blended in a container and the mixture was stirred until a uniform solution was obtained to obtain the composition B (y-5).

Preparation of Liquid Composition B (y-6) (for Preparation of Composition (c-6) Used in Examples 6 and 15)

448.1 parts of the polyester polyol 1, 409.0 parts of 2-hydroxypropyl methacrylate (light ester HOP (N) manufactured by Kyoei Co., Ltd.), 141.6 parts of diethylene glycol dimethacrylate (NK ester 2G manufactured by Shin Nakamura Chemical Industry Co., Ltd.), 0.1 part of toluhydroquinone, 0.4 part of 4-methyl-2,6-di-tert-butylphenol, 0.8 part of dibutyltin dilaurate were blended in a container and the mixture was stirred until a uniform solution was obtained to obtain the composition B (y-6).

Preparation of Liquid Composition B (y-7) (for Preparation of Composition (c-7) Used in Examples 7 and 16)

338.4 parts of the polyester polyol 1, 659.8 parts of 2-hydroxypropyl methacrylate (Light Ester HOP (N) manufactured by Kyoei Co., Ltd.), 0.1 part of toluhydroquinone, 0.5 parts of 4-methyl-2,6-di-tert-butylphenol, 1.2 parts of dibutyltin dilaurate were blended in a container and the mixture was stirred until a uniform solution was obtained to obtain composition B (y-7).

Preparation of Liquid Composition B (y-8) (for Preparation of Composition (c-8) Used in Examples 8 and 17)

514.5 parts of the polyester polyol 1, 177.3 parts of 2-hydroxypropyl methacrylate (light ester HOP (N) manufactured by Kyoei Co., Ltd.), 307.0 parts of diethylene glycol dimethacrylate (NK ester 2G manufactured by Shin Nakamura Chemical Industry Co., Ltd.), 0.1 part of toluhydroquinone, 0.4 part of 4-methyl-2,6-di-tert-butylphenol, 0.7 part of dibutyltin dilaurate were blended in a container and the mixture was stirred until a uniform solution was obtained to obtain the composition B (y-8).

Preparation of Liquid Composition B (y-9) (for Preparation of Composition (c-9) Used in Examples 9 and 18)

498.1 parts of the polyester polyol 1, 423.2 parts of 2-hydroxypropyl methacrylate (light ester HOP (N) manufactured by Kyoei Co., Ltd.), 77.4 parts of diethylene glycol dimethacrylate (NK ester 2G manufactured by Shin Nakamura Chemical Industry Co., Ltd.), 0.1 part of toluhydroquinone, 0.4 part of 4-methyl-2,6-di-tert-butylphenol, 0.8 part of dibutyltin dilaurate were blended in a container and the mixture was stirred until a uniform solution was obtained to obtain the composition B (y-9).

Preparation of Liquid Composition B (y-10) (for Preparation of Composition (c-10) Used in Examples 10 and 19)

75.9 parts of the polyester polyol 1, 922.1 parts of 2-hydroxypropyl methacrylate (light ester HOP (N) manufactured by Kyoei Co., Ltd.), 0.1 part of toluhydroquinone, 0.6 parts of 4-methyl-2,6-di-tert-butylphenol, 1.3 parts of dibutyltin dilaurate were blended in a container and the mixture was stirred until a uniform solution was obtained to obtain composition B (y-10).

The prepared liquid compositions A and B were blended at the ratio shown in Table 1 respectively and stirred for about 30 seconds until a uniform solution was obtained to obtain liquid compositions (C-1 to 10) for an intermediate base material. Further, the viscosity of the prepared liquid composition, the molar ratio of reactive groups with isocyanate group in the composition (B) to the number of moles of isocyanate groups in the composition (A) (B/A), and the theoretical ethylenically unsaturated group equivalents of the urethane (meth) acrylates formed after aging were listed in Table 1.

Comparative Example Resin Preparation

As a comparative example, a resin was prepared.
Preparation of Urethane (Meta) Acrylate Resin (UA-1) (Compositions (c-11) Used in Comparative Examples 1, 4 and 7)

988.1 parts of the above urethane methacrylate (UA-1), 2.0 parts of PR-CBZ 04 (Dedicated accelerator manufactured by Japan U-Pica Company), 9.9 parts of Perbutyl E (monooxycarbonate organic peroxide manufactured by NOF Corporation) were prepared at 80° C., and the mixture was stirred until a uniform solution was obtained to obtain a resin composition (C-11).

Preparation of Epoxy (Meta) Acrylate Resin (EA-1) (Compositions (c-12) Used in Comparative Examples 2, 5 and 8)

990.1 parts of the above epoxy (meth) acrylate (EA-1), 9.9 parts of perbutyl E (monooxycarbonate-based organic peroxide manufactured by NOF Corporation) were prepared at 80° C., and the mixture was stirred until a uniform solution was obtained to obtain a resin composition (C-12).

Preparation of Epoxy Composition (EP-1) (Compositions (c-13) Used in Comparative Examples 3, 6 and 9)

45.9 parts of dicyandiamide and 36.7 parts of urea derivative were blended to 917.4 parts of a bisphenol A type epoxy resin blend product (Epoxycoat #1001/828=50/50 manufactured by Japan Epoxy Resin Co., Ltd.), and the mixture was stirred until a uniform solution was obtained to obtain a resin composition (C-13).

Preparation of Epoxy (Meta) Acrylate (EA-2) (Composition (c-14) Used in Comparative Example 10)

772.2 parts of Neopol 8101 (manufactured by Japan U-Pica Co., Ltd.), 216.2 parts of 4,4'-diphenylmethane diisocyanate (manufactured by Mitsui Chemicals Co., Ltd., Cosmonate LL), 5.8 parts of Perhexa C75 (manufactured by Nichiyu Co., Ltd. peroxyester-based isocyanate), 5.8 parts of Kayacarboxylic BIC-75 (peroxyester-based organic peroxide manufactured by Kayaku Akzo Co., Ltd.) were blended and the mixture was stirred until a uniform solution was obtained to obtain a resin composition (c-14).

The viscosities of the resins prepared above are listed in Table 1. Table 1 shows the preparation of the liquid composition and the like.

TABLE 1

| | Liquid composition No. | C-1 | C-2 | C-3 | C-4 | C-5 | C-6 | C-7 | C-8 | C-9 | C-10 | C-11 | C-12 | C-13 | C-14 |
|---|---|---|---|---|---|---|---|---|---|---|---|---|---|---|---|
| Formulation | Composition A Type | x-1 | x-2 | x-3 | x-4 | x-5 | x-6 | x-7 | x-8 | x-9 | x-10 | UA-1 | EA-1 | EP-1 | EA-2 |
| | Composition A Bleeding amount | 41.0 | 44.5 | 37.8 | 46.5 | 39.4 | 37.1 | 50.2 | 35.5 | 38.0 | 52.9 | | | | |
| | Composition B Type | y-1 | y-2 | y-3 | y-4 | y-5 | y-6 | y-7 | y-8 | y-9 | y-10 | | | | |
| | Composition B Bleeding amount | 59.0 | 55.5 | 62.2 | 53.5 | 60.6 | 62.9 | 48.8 | 64.5 | 84.0 | 47.3 | | | | |

TABLE 1-continued

| Liquid composition No. | | | C-1 | C-2 | C-3 | C-4 | C-5 | C-6 | C-7 | C-8 | C-9 | C-10 | C-11 | C-12 | C-13 | C-14 |
|---|---|---|---|---|---|---|---|---|---|---|---|---|---|---|---|---|
| Physical charac-terisitics | Viscosity (25° C.) mPa · s | | 30 | 40 | 35 | 55 | 24 | 41 | 30 | 60 | 58 | 25 | — | — | — | 200 |
| | Viscosity (80° C.) Pa · s | | — | — | — | — | — | — | — | — | — | — | 80 | 11.2 | 15 | — |
| | Molar ratio of reactive group*[1] | | 0.93 | 0.93 | 0.93 | 0.93 | 1.00 | 1.11 | 0.77 | 0.94 | 1.25 | 0.70 | 0.93 | — | — | — |
| | acrylic equivalent eq/mol | | 502 | 402 | 502 | 402 | 499 | 502 | 430 | 998 | 500 | 328 | 502 | — | — | — |

In table 1, *1 shows the molar ratio of reactive groups with isocyanate group in the composition (B) to the number of moles of isocyanate groups in the composition (A) (B/A).

[Wet Through Test]

For the purpose of evaluating the impregnation property of the liquid composition and the resin, the liquid composition (c-1 to 10) and the resin composition (c-11 to 14) shown in Table 1 were applied to one carbon fiber (3K twill, TR3523M manufactured by Mitsubishi Chemical Corporation). Two drops of the resin composition were dropped on the carbon fiber at each impregnation temperature with a dropper, and the time for impregnation to the back surface under normal pressure was measured. The test results were shown in Table 2. Table 2 shows the results of the wet through test (evaluation of impregnation of liquid composition and resin).

TABLE 2

| Liquid composition No. | C-1 | C-2 | C-3 | C-4 | C-5 | C-6 | C-7 | C-8 | C-9 | C-10 | C-11 | C-12 | C-13 | C-14 |
|---|---|---|---|---|---|---|---|---|---|---|---|---|---|---|
| Test temperature ° C. | 23 | 23 | 23 | 23 | 23 | 23 | 23 | 23 | 23 | 23 | 80 | 80 | 80 | 23 |
| Wet through test | ⊚ | ⊚ | ⊚ | ⊚ | ⊚ | ⊚ | ⊚ | ⊚ | ⊚ | ⊚ | x | x | x | Δ |

(Judgment method)
⊚ 10 seconds or less
○ 20 seconds or less
Δ 30 seconds or less
x 30 seconds or more

[Measurement of Shrinkage Rate]

For the purpose of evaluating dimensional stability, the shrinkage rate of the cured product of the liquid composition (c-1 to 10) and the resin composition (c-11 to 14) was measured. The shrinkage rate was calculated from the specific gravity of the liquid and the specific gravity of the cured product. Further, the liquid composition (c-1 to 10) was cured after the thickening was completed. Table 3 shows the thickening conditions and the measurement results of the shrinkage rate.

TABLE 3

| Liquid composition No. | | | C-1 | C-2 | C-3 | C-4 | C-5 | C-6 | C-7 | C-8 | C-9 | C-10 | C-11 | C-12 | C-13 | C-14 |
|---|---|---|---|---|---|---|---|---|---|---|---|---|---|---|---|---|
| Aging conditions | Temperature | ° C. | 50 | 50 | 50 | 40 | 50 | 50 | 50 | 50 | 50 | 50 | — | — | — | 23 |
| | Time | day | 2 | 2 | 2 | 3 | 2 | 2 | 2 | 2 | 2 | 2 | — | — | — | 7 |
| Curing conditions | Temperature | ° C. | 120 | 120 | 120 | 120 | 120 | 120 | 120 | 120 | 120 | 120 | 120 | 120 | 120 | 120 |
| | Time | hour | 2 | 2 | 2 | 2 | 2 | 2 | 2 | 2 | 2 | 2 | 2 | 2 | 2 | 2 |
| Shrinkage test | | | 3.2 | 3.3 | 3.6 | 3.6 | 3.5 | 3.2 | 3.5 | 3.0 | 2.7 | 3.1 | 3.3 | 4.0 | 3.4 | 8.3 |

[Manufacture of Intermediate Base Material]

Manufacture of Prepreg (P-1 to 16)

Table 4 shows the conditions for manufacturing the intermediate base material (prepreg) and the impregnation state of the prepreg.

TABLE 4

| | | | Exa. 1 | Exa. 2 | Exa. 3 | Exa. 4 | Exa. 5 | Exa. 6 | Exa. 7 | Exa. 8 |
|---|---|---|---|---|---|---|---|---|---|---|
| Inter-mediate base material | Prepreg No. | | P-1 | P-2 | P-3 | P-4 | P-5 | P-6 | P-7 | P-8 |
| | Lquid composition (Resin) Type | | C-1 | C-2 | C-3 | C-4 | C-5 | C-6 | C-7 | C-8 |
| | Liquid composition (Resin) Amount g | | 150 | 150 | 150 | 150 | 150 | 150 | 150 | 150 |
| | Fibers Type | | Carbon fiber (3k twill weave TR3523M(manufactured by Mitsubishi Chemical Operation) | | | | | | | |
| | Fibers Weight | | 222 g (33 cm square with 10 piles) 22 g × 10 | | | | | | | |
| | Impregnation temperature | ° C. | 25 | 25 | 25 | 25 | 25 | 25 | 25 | 25 |

TABLE 4-continued

| | | | | | | | | | |
|---|---|---|---|---|---|---|---|---|---|
| Aging temperature | °C. | 50 | 50 | 50 | 50 | 40 | 50 | 50 | 50 |
| Aging period | day | 2 | 2 | 2 | 2 | 2 | 2 | 2 | 2 |
| Weight per | kg/m² | 3.3 | 3.3 | 3.3 | 3.3 | 3.3 | 3.3 | 3.3 | 3.3 |
| State if prepreg (impregnation) | | ○ | ○ | ○ | ○ | ○ | ○ | ○ | ○ |

| | | | Exa. 9 | Exa. 10 | Comparative Exa. 1 | Comparative Exa. 2 | Comparative Exa. 3 | Comparative Exa. 4 | Comparative Exa. 5 | Comparative Exa. 6 |
|---|---|---|---|---|---|---|---|---|---|---|
| | Prepreg No. | | P-9 | P-10 | P-11 | P-12 | P-13 | P-14 | P-15 | P-16 |
| Intermediate base material | Lquid composition (Resin) Type | | C-9 | C-10 | C-11 | C-12 | C-13 | C-14 | C-15 | C-16 |
| | Liquid composition (Resin) Amount g | | 150 | 150 | 150 | 150 | 150 | 150 | 150 | 150 |
| | Fibers Type | | Carbon fiber (3k twill weave TR3523M(manufactured by Mitsubishi Chemical Operation) | | | | | | | |
| | Fibers Weight | | 222 g (33 cm square with 10 piles) 22 g × 10 | | | | | | | |
| | Impregnation temperature | °C. | 25 | 25 | 80 | 80 | 80 | 80 | 80 | 80 |
| | Aging temperature | °C. | 50 | 50 | No aging (hot melt method) | | | | | |
| | Aging period | day | 2 | 2 | | | | | | |
| | Weight per | kg/m² | 3.3 | 3.3 | 3.3 | 3.3 | 3.3 | 0.3 | 0.3 | 0.3 |
| | State if prepreg (impregnation) | | ○ | ○ | x (Unimpregnated) | | | ○ | ○ | ○ |

The liquid composition (c-1 to 10) and the resin composition (c-11 to 13) shown in Table 1 was impregnated into 10 sheets of 33 cm square carbon fibers (3K twill, TR3523M, manufactured by Mitsubishi Chemical Corporation) with the formulation shown in Table 4, and then aged under each condition to obtain a prepreg. The obtained prepreg had about 60% by weight of fibers.

Regarding P-11 to 13 (Comparative Examples 1 to 3), they were tried to impregnate by the hot melt method, but the impregnation was insufficient, so the weight per unit area of 3.3 kg to 0.3 kg (Impregnation of a single piece of carbon fiber) was carried out in Comparative Examples 4 to 6.

Manufacture of C-SMC (S-1 to 13)

Table 5 shows the intermediate base material (C-SMC) preparation conditions and the impregnation state of C-SMC.

TABLE 5

| | | | Exa.11 | Exa.12 | Exa.13 | Exa.14 | Exa.15 | Exa.16 | Exa.17 | Exa.18 |
|---|---|---|---|---|---|---|---|---|---|---|
| | C-SMC No | | S-1 | S-2 | S-3 | S-4 | S-5 | S-6 | S-7 | S-8 |
| Intermediate base material | Liquid Composition (Resin) Type | | C-1 | C-2 | C-4 | C-5 | C-6 | C-7 | C-8 | C-9 |
| | Liquid Composition (Resin) Amount | g | 175 | 175 | 175 | 175 | 175 | 175 | 175 | 175 |
| | Fibers Type | | Carbon fiber bundle cut to a length of 25 mm and uniformly dispersed (TR50S I2L manufactured by Mitsubishi Chemical Corporation) | | | | | | | |
| | Fibers Weight | | 210 g | | | | | | | |
| | The size of the created C-SMC | | 25 cm square | 35 cm square | 25 cm square | 25 cm square | 35 cm square | 25 cm square | 35 cm square | 25 cm square |
| | Impregnation temperature | °C. | 25 | 25 | 25 | 25 | 25 | 25 | 25 | 25 |
| | Aging temperature | °C. | 50 | 50 | 40 | 50 | 50 | 50 | 50 | 50 |
| | Aging period | day | 2 | 2 | 3 | 2 | 2 | 2 | 2 | 2 |
| | Weight per unit area | kg/m² | 5.2 | 3.1 | 6.2 | 6.2 | 3.1 | 3.1 | 5.2 | 8.2 |
| | State of C-SMC (impregnation) | | ○ | ○ | ○ | ○ | ○ | ○ | ○ | ○ |
| Molding | Press pressure | MPa | | | | | 8 | | | |
| | Press Time | min | | | | | 7.0 | | | |

| | | | Exa.19 | Comparative Exa.7 | Comparative Exa.8 | Comparative Exa.9 | Comparative Exa.10 |
|---|---|---|---|---|---|---|---|
| | C-SMC No | | S-9 | S-10 | S-11 | S-12 | S-13 |
| Intermediate | Liquid Composition | | C-7 | C-8 | C-9 | C-10 | C-11 |

TABLE 5-continued

| base material | (Resin) Type Liquid Composition (Resin) Amount | g | 175 | 175 | 175 | 175 | 175 |
|---|---|---|---|---|---|---|---|
| | Fibers Type | | Carbon fiber bundle cut to a length of 25 mm and uniformly dispersed (TR50S I2L manufactured by Mitsubishi Chemical Corporation) | | | | |
| | Fibers Weight | | 210 g | | | | |
| | The size of the created C-SMC | | 25 cm square | After making the toe prepreg (hot melt method) in advanced, cut the prepreg to | | | 35 cm square |
| | Impregnation temperature | ° C. | 25 | 25 mm and make it C-SMC. | | | 25 |
| | Aging temperature | ° C. | 50 | | | | 23 |
| | Aging period | day | 2 | | | | 7 |
| | Weight per unit area | kg/m² | 6.2 | | | | 3.1 |
| | State of C-SMC (impregnation) | | ○ | ○ | ○ | ○ | ○ |
| Molding | Press pressure | MPa | 8 | | | | |
| | Press Time | min | 7.0 | | | | |

The liquid composition (c-1 to 10 excluding c-2) and the resin composition (c-11 to 14) shown in Table 1 were impregnated into carbon fibers (TR50S 12L manufactured by Mitsubishi Chemical Corporation) cut to a length of 25 mm and uniformly dispersed in 25 cm square or 35 cm square with the formulation shown in Table 5, and then aged under each condition to obtain the C-SMC. The obtained C-SMC had about 55% by weight of fibers. For S-10 to 12 (Comparative Examples 7 to 9), tow prepregs were manufactured by a hot melt method, and then the manufactured tow prepregs were cut to a length of 25 mm to obtain the C-SMC.

[Molding of Intermediate Base Material]

Molding of Prepregs

Using the manufactured prepregs (P-1 to 10 and P-14 to 16), molding was performed by a press (using a 100-ton press machine manufactured by Toho Press Mfg. Co., Ltd.) to obtain a molded sheet (Examples 1 to 10), and Comparative Examples 4 to 6). The temperature at the time of press molding was 130° C., the molding pressure was 10 bar, and the molding time was 7 minutes.

Molding of C-SMC

Using the manufactured C-SMC (S-1 to 13), molding was performed by a press (using a 100-ton press machine manufactured by Toho Press Mfg. Co., Ltd.) to obtain a molded sheet (Examples 11 to 19 and Comparison Examples 7-10). The temperature at the time of press molding was 130° C., the molding pressure was 8 MPa, and the molding time was 7 minutes.

[Measurement of Physical Properties of Molded Sheet]

The obtained molded sheet was subjected to a bending test, an interlaminar shear test, a moldability and an impregnation property test.

Bending Test

Measurements were performed by a method conforming to JIS K 7171 and ASTM D 790.

Interlaminar Shear Test

Measurements were performed by a method conforming to JIS K 7078 and ASTM D 2344.

Moldability and Impregnation Test (Presence or Absence of Voids and Non-Impregnated Parts)

For the purpose of confirming impregnation and moldability, the cross section of the test piece having a molding thickness of about 2.4 mm and a length of 30 cm was confirmed with a microscope, and the number of voids and unimpregnated parts was confirmed.

(Judgment Method)

Number of voids and unimpregnated parts per cross-sectional area 0 to 1 ○

2-3 pieces Δ

3 or more x

Tables 6 and 7 show the results of the bending test, the interlaminar shear test, the physical property evaluation test results, the moldability and the impregnation property test for the prepreg molded sheet and the C-SMC molded sheet.

TABLE 1

| | | Exa.1 | Exa.2 | Exa.3 | Exa.4 | Exa.5 | Exa.6 | Exa.7 | Exa 8 | Exa.9 | Exa.10 | Comparative Exa.4 | Comparative Exa.5 | Comparative Exa.6 |
|---|---|---|---|---|---|---|---|---|---|---|---|---|---|---|
| Prepreg No. | | P-1 | P-2 | P-3 | P-4 | P-5 | P-6 | P-7 | P-8 | P-9 | P-10 | P-14 | P-15 | P-16 |
| Flexural strength MS) | MPa | 1080 | 989 | 1025 | 1022 | 1034 | 992 | 1051 | 989 | 935 | 811 | 930 | 852 | 921 |
| Interlaminar shear strength (JIS) | MPa | 97 | 92 | 93 | 95 | 97 | 89 | 85 | 81 | 60 | 55 | 76 | 51 | 65 |

TABLE 1-continued

|  |  | Exa.1 | Exa.2 | Exa.3 | Exa.4 | Exa.5 | Exa.6 | Exa.7 | Exa 8 | Exa.9 | Exa.10 | Comparative Exa.4 | Comparative Exa.5 | Comparative Exa.6 |
|---|---|---|---|---|---|---|---|---|---|---|---|---|---|---|
| Interlaminar shear strength (ASTM) | MPa | 107 | 105 | 104 | 108 | 107 | 96 | 92 | 92 | 66 | 61 | 90 | 59 | 71 |
| Moldability and impregnation test |  | ◯ | ◯ | ◯ | ◯ | ◯ | ◯ | ◯ | ◯ | ◯ | ◯ | Δ | x | x |

TABLE 7

|  |  | Exa.11 | Exa.12 | Exa.13 | Exa.14 | Exa.15 | Exa.16 | Exa.17 | Exa.18 | Exa.1 9 | Comparative Exa.7 | Comparative Exa.8 | Comparative Exa.9 | Comparative Exa.10 |
|---|---|---|---|---|---|---|---|---|---|---|---|---|---|---|
| C-SMC No. |  | S-1 | S-2 | S-3 | S-4 | S-5 | S-6 | S-7 | S-8 | S-9 | S-10 | S-11 | S-12 | S-13 |
| Flexural strength (ASTM) | MPa | 637 | 651 | 580 | 602 | 624 | 520 | 500 | 305 | 328 | 402 | 276 | 376 | 380 |
| Interlaminar shear strength (ASTM) | MPa | 65 | 67 | 62 | 68 | 71 | 59 | 60 | 44 | 41 | 45 | 24 | 45 | 41 |
| Moldandity and impregnation test |  | ◯ | ◯ | ◯ | ◯ | ◯ | ◯ | ◯ | ◯ | ◯ | x | x | x | Δ |

From Tables 2 to 5, it can be seen that the liquid composition provides an intermediate base material having excellent impregnation property into the base material, small shrinkage during curing, and excellent dimensional stability. Further, from Tables 6 and 7, it can be seen that the intermediate base material has excellent mechanical properties and provides a highly reliable composite material having almost no voids or unimpregnated parts. According to the present invention using the liquid composition having a low viscosity and excellent impregnation property, it is possible to provide high-strength FRP with as few reduced voids as possible by reducing the number of laminations and FRP with excellent dimensional stability regarding the liquid compositions capable of producing intermediate substrates with a large unit area weight and intermediate substrates with a large unit area weight.

Next, the liquid composition for a fiber reinforced plastic intermediate base material of the present invention, which comprises a composition containing a compound (a1) having two or more epoxy groups in another aspect of the present invention, is described below in Examples. Hereinafter, one embodiment of the present invention will be described in more detail, but the present invention is not limited to these examples. In the Examples, "parts" are parts by weight unless otherwise specified. In the Examples, prepreg and C-SMC (carbon SMC (Sheet Molding Compound)) were prepared as examples of the intermediate base material.

Comparative Synthesis Example 3

(Synthesis of Epoxy (Meth) Acrylate Resin (EA-1))

539.2 parts of bisphenol A type epoxy compound with epoxy equivalent of 430 g/eq, 108.3 parts of methacrylic acid, 1.95 parts of triphenylphosphine and 0.24 parts of hydroquinone were charged. Under air (0.2 L/min), the mixture was kept at a temperature of 110 to 120° C., and reacted for 10 hours. Then, it was diluted with 350.0 parts of styrene to obtain an epoxy acrylate resin having an acid value of 6.1 mg/KOH.

Comparative Synthesis Example 4

(Synthesis of Epoxy (Meth) Acrylate Resin (EA-2))

689.9 parts of bisphenol A type epoxy compound (JER "#1001"), 127.6 parts of methacrylic acid, 1.6 parts of 2-methylimidazole, and 0.8 parts of monomethyl ether hydroquinone were charged in a five-necked flask equipped with a thermometer, an agitator, a gas introduction tube, and a reflux condenser. Under air flow (0.2 L/min), the mixture was kept at a temperature of 110 to 120° C., and reacted for 10 hours. Then, it was diluted with 180.0 parts of diethylene glycol dimethacrylate (NK ester 2G, manufactured by Shin Nakamura Chemical Industry Co., Ltd.) to obtain an epoxy acrylate resin having an acid value of 2.4 mg/KOH.

[Preparation of Liquid Composition]

Composition A and composition B were prepared, respectively.

<Preparation of Composition A>

Preparation of Liquid Composition A (x-1) (for Preparation of Composition (C-1) Used in Examples 20 and 28)

816.9 parts of bisphenol A type epoxy compound (EP-190 manufactured by DIC Corporation), 162.8 parts of diethylene glycol dimethacrylate (NK ester 2G manufactured by Shin Nakamura Chemical Industry Co., Ltd.), 20.3 parts of perbutyl E (monooxycarbonate series organic peroxide manufactured by Nichiyu Co., Ltd.) were blended in a container and stirred at room temperature until a uniform solution was obtained to obtain composition A (x-1).

Preparation of Liquid Composition A (x-2) (for Preparation of Composition (C-2) Used in Examples 21 and 29)

777.5 parts of bisphenol A type epoxy compound (JER "#1001"), 205.4 parts of diethylene glycol dimethacrylate (NK ester 2G manufactured by Shin-Nakamura Chemical Industry Co., Ltd.), 17.1 part of perbutyl E (monooxycarbonate series organic peroxide manufactured by Nikko Co., Ltd.) were blended in a container, and the mixture was stirred at room temperature until a uniform solution was obtained to obtain composition A (x-2).

Preparation of Liquid Composition A (x-3) (for Preparation of Composition (C-3) Used in Examples 22 and 30)

719.8 parts of bisphenol A type epoxy compound (JER "#1002"), 263.7 parts of diethylene glycol dimethacrylate (NK ester 2G, manufactured by Shin Nakamura Chemical Industry Co., Ltd.), 16.5 parts of perbutyl E (monooxycarbonate series organic peroxide manufactured by Nikko Co., Ltd.) were blended in a container and the mixture was stirred at room temperature until a uniform solution was obtained to obtain composition A (x-3).

Preparation of Liquid Composition A (x-4) (for Preparation of Composition (C-4) Used in Examples 23 and 31)

736.3 parts of Cresol novolac type epoxy resin (EPI-CLON N-690 manufactured by DIC Corporation), 244.4 parts of diethylene glycol dimethacrylate (NK ester 2G manufactured by Shin-Nakamura Chemical Co., Ltd.), 19.3 parts of perbutyl E (monooxycarbonate series organic peroxide manufactured by Nichiyu Co., Ltd.) were blended in a container, and the mixture was stirred at room temperature until a uniform solution was obtained to obtain composition A (x-4).

Preparation of Liquid Composition A (x-5) (for Preparation of Composition (C-5) Used in Examples 24 and 32)

824.4 parts of bisphenol A type epoxy compound (EP-190 manufactured by DIC Corporation), 154.5 parts of diethylene glycol-dimethacrylate (NK ester 2G manufactured by Shin Nakamura Chemical Industry Co., Ltd.), 21.1 parts of perbutyl E (monooxycarbonate series organic peroxide manufactured by Nichiyu Co., Ltd.) were blended in a container and the mixture was stirred at room temperature until a uniform solution was obtained to obtain composition A (x-5).

Preparation of Liquid Composition A (x-6) (for Preparation of Composition (C-6) Used in Examples 25 and 33)

829.5 parts of bisphenol A type epoxy compound (EP-190 manufactured by DIC Corporation), 148.3 parts of diethylene glycol dimethacrylate (NK ester 2G manufactured by Shin Nakamura Chemical Industry Co., Ltd.), 22.2 parts of perbutyl E (monooxycarbonate series organic peroxide manufactured by Nikko Co., Ltd.) were blended in a container and the mixture was stirred at room temperature until a uniform solution was obtained to obtain composition A (x-6).

Preparation of Liquid Composition A (x-7) (for Preparation of Composition (C-7) Used in Examples 26 and 34)

383.0 parts of bisphenol A type epoxy compound (EP-190 manufactured by DIC Corporation), 142.6 parts of diethylene glycol dimethacrylate (NK ester 2G manufactured by Shin Nakamura Chemical Industry Co., Ltd.), 19.4 parts of perbutyl E (monooxycarbonate series organic peroxide manufactured by Nichiyu Co., Ltd.) were blended in a container and the mixture was stirred at room temperature until a uniform solution was obtained to obtain composition A (x-7).

Preparation of Liquid Composition A (x-8) (for Preparation of Composition (C-8) Used in Examples 27 and 35)

695.3 parts of bisphenol A type epoxy compound (JER "#1004"), 288.7 parts of diethylene glycol dimethacrylate (NK ester 2G manufactured by Shin-Nakamura Chemical Industry Co., Ltd.), 16.0 parts of perbutyl E (monooxycarbonate series organic peroxide manufactured by Nikko Co., Ltd.) were blended in a container and the mixture was stirred at room temperature until a uniform solution was obtained to obtain composition A (x-8).

<Preparation of Composition B>

Preparation of Liquid Composition B (y-1) (for Preparation of Composition (C-1) Used in Examples 20 and 28)

966.0 parts of methacrylic acid (manufactured by Mitsubishi Gas Chemical Company, Inc.), 0.9 parts of toluhydroquinone, 3.4 parts of 4-methyl-2,6-ditershary butylphenol, 29.7 parts of triphenylphosphine were blended in a container and the mixture was stirred until a uniform solution was obtained to obtain composition B (y-1).

Preparation of Liquid Composition B (y-2) (for Preparation of Composition (C-2) Used in Examples 21 and 29)

930.0 parts of methacrylic acid (manufactured by Mitsubishi Gas Chemical Company, Inc.), 1.9 parts of toluhydroquinone, 7.3 parts of 4-methyl-2,6-ditershary butylphenol, 60.7 parts of triphenylphosphine were blended in a container and the mixture was stirred until a uniform solution was obtained to obtain composition B (y-2).

Preparation of Liquid Composition B (y-3) (for Preparation of Composition (C-3) Used in Examples 22 and 30)

899.3 parts of methacrylic acid (manufactured by Mitsubishi Gas Chemical Company, Inc.), 2.7 parts of toluhydroquinone, 10.0 parts of 4-methyl-2,6-ditershary butylphenol, 88.0 parts of triphenylphosphine were blended in a container and the mixture was stirred until a uniform solution was obtained to obtain composition B (y-3).

Preparation of Liquid Composition B (y-4) (for Preparation of Composition (C-4) Used in Examples 23 and 31)

962.1 parts of methacrylic acid (manufactured by Mitsubishi Gas Chemical Company, Inc.), 1.1 parts of toluhydroquinone, 4.0 parts of 4-methyl-2,6-ditershary butylphenol, 32.8 parts of triphenylphosphine were blended in the container and the mixture was stirred until a uniform solution was obtained to obtain composition B (y-4).

Preparation of Liquid Composition B (y-5) (for Preparation of Composition (C-5) Used in Examples 24 and 32)

969.0 parts of methacrylic acid (manufactured by Mitsubishi Gas Chemical Company, Inc.), 0.8 parts of toluhydroquinone, 3.1 parts of 4-methyl-2,6-di-tert-butylphenol, and 27.1 parts of triphenylphosphine were blended in a container and the mixture was stirred until a uniform solution was obtained to obtain composition B (y-5).

Preparation of Liquid Composition B (y-6) (for Preparation of Composition (C-6) Used in Examples 25 and 33)

973.2 parts of methacrylic acid (manufactured by Mitsubishi Gas Chemical Company), 3.2 parts of toluhydroquinone, 2.8 parts of 4-methyl-2,6-ditershary butylphenol, and 23.3 parts of triphenylphosphine were blended in a container and the mixture was stirred until a uniform solution was obtained to obtain composition B (y-6).

Preparation of Liquid Composition B (y-7) (for Preparation of Composition (C-7) Used in Examples 26 and 34)

961.3 parts of methacrylic acid (manufactured by Mitsubishi Gas Chemical Company, Inc.), 1.1 parts of toluhydroquinone, 3.9 parts of 4-methyl-2,6-ditershary butylphenol, 33.7 parts of triphenylphosphine were blended in a container and the mixture was stirred until a uniform solution was obtained to obtain composition B (y-7).

Preparation of Liquid Composition B (y-8) (for Preparation of Composition (C-8) Used in Examples 27 and 35)

871.0 parts of methacrylic acid (manufactured by Mitsubishi Gas Chemical Company, Inc.), 3.7 parts of toluhydroquinone, 13.9 parts of 4-methyl-2,6-di-tert-butylphenol, 111.4 parts of triphenylphosphine were blended in a container and the mixture was stirred until a uniform solution was obtained to obtain composition B (y-8).

The prepared liquid compositions A and B were blended at the ratios shown in Table 8 and the mixture was stirred until a uniform solution was obtained to obtain liquid compositions (C-1 to 8) for intermediate base materials. Further, the viscosity of the prepared liquid composition, the molar ratio of unsaturated group containing monocarboxylic acid in the composition (B) to the number of moles of epoxy groups in the composition (A) (B/A), and the theoretical ethylenically unsaturated group equivalents of the epoxy (meth) acrylates formed after aging were shown in Table 8. Table 8 shows the preparation of the liquid composition. In Table 8, *1 shows the molar ratio (B/A) of unsaturated group containing monocarboxylic acid in the composition (B) to the number of moles of epoxy groups in the composition (A).

peroxide manufactured by NOF Corporation) at 80° C., were prepared and the mixture was stirred until a uniform solution was obtained to obtain the composition (C-10).

[Preparation of Urethane Acrylate Forming Liquid Composition Liquid as Comparison Liquid]

Further, as a comparative example, liquid compositions A and B for forming urethane acrylate were prepared, respectively. The prepared liquid compositions A and B were blended at the ratios shown in Table 8 and stirred until a uniform solution was obtained to obtain a liquid composition (C-11) for an intermediate base material.

Preparation of Urethane Acrylate Forming Liquid Composition Liquid A (z-1) (for Preparation of Compositions (C-11) Used in Comparative Examples 13 and 16)

975.6 parts of isophorone diisocyanate (manufactured by Evonik), 24.4 parts of perbutyl E (monooxycarbonate series organic peroxide manufactured by NOF Corporation), were blended in a container and the mixture was stirred at room temperature until a uniform solution was obtained to obtain a composition (z-1).

Preparation of Urethane Acrylate Forming Liquid Composition Liquid B (z-2) (for Preparation of Composition (C-11) Used in Comparative Examples 13 and 16)

409.8 parts of the above polyester polyol 1, 437.7 parts of 2-hydroxypropyl methacrylate (light ester HOP (N) manufactured by Kyoei Co., Ltd.), 151.0 parts of diethylene glycol dimethacrylate (NK ester 2G manufactured by Shin

TABLE 8

| Liquid composition No. | | | C-1 | C-2 | C-3 | C-4 | C-5 | C-6 | C-7 | C-8 | C-9 | C-10 | C-11 |
|---|---|---|---|---|---|---|---|---|---|---|---|---|---|
| Formulation | Coposition A Tpe | | x-1 | x-2 | x-3 | x-4 | x-5 | x-6 | x-7 | x-8 | EA-1 | EA-2 | x-1 |
| | Composition A Bleeding amount | | 737.3 | 876.5 | 910.2 | 777.4 | 711.9 | 674.4 | 771.5 | 935.4 | | | 410.0 |
| | Composition B Type | | y-1 | y-2 | y-3 | y-4 | y-5 | y-6 | y-7 | y-8 | | | z-2 |
| | Composition B Bleeding amount | | 262.7 | 123.5 | 89.8 | 222.6 | 288.1 | 325.6 | 228.5 | 64.8 | | | 590.0 |
| Physical characteristics | Viscosity | mPa · s | 100 | 500 | 300 | 150 | 130 | 85 | 150 | 300 | 215 | 12 | 30 |
| | Viscosity measurment temperature | ° C. | 30 | 25 | 40 | 40 | 30 | 30 | 30 | 60 | 25 | 80 | 25 |
| | Molar ratio reactive group*1 | | 0.92 | 0.93 | 0.93 | 0.93 | 1.05 | 1.25 | 0.75 | 0.93 | — | — | — |
| | acrylic equivalent | eq/mol | 289 | 59 | >785 | 316 | 266 | 237 | 338 | 1085 | — | — | — |

Comparative Example Resin Preparation

As a comparative example, a resin was prepared.

Preparation of Epoxy (Meta) Acrylate Resin (EA-1) (Compositions (C-9) Used in Comparative Examples 11 and 14)

800.0 parts of the above epoxy methacrylate (EA-1), 192.0 parts of Cosmonate LL (modified diphenylisocyanate manufactured by Mitsui Chemicals, Inc.), 8.0 parts of Perbutyl E (monooxycarbonate series organic peroxide manufactured by NOF Corporation) were prepared at 25° C., and the mixture was stirred until a uniform solution was obtained to obtain a composition (C-9).

Preparation of Epoxy (Meta) Acrylate Resin (EA-2) (Compositions (C-10) Used in Comparative Examples 12 and 15)

990.0 parts of the above epoxy (meth) acrylate (EA-2) and 10.0 parts of perbutyl E (monooxycarbonate series organic Nakamura Chemical Industry Co., Ltd.), 0.1 part of toluhydroquinone, 0.5 part of 4-methyl-2,6-ditershary butylphenol, 0.9 part of dibutyltin dilaurate, were blended in a container, and the mixture was stirred until a uniform solution was obtained to obtain the composition B (z-2).

The viscosities of the resins prepared above were shown in Table 8.

[Measurement of Shrinkage Rate of Composition Alone]

For the purpose of evaluating dimensional stability, the shrinkage rate of the cured product of the above liquid compositions (C-1 to 11) was measured. The shrinkage rate was calculated from the specific gravity of the liquid and the specific gravity of the cured product. Further, (C-1 to 8 and C-11) were cured after the thickening was completed.

Table 9 shows the measurement results of aging conditions and shrinkage rate.

TABLE 9

| Liquid composition No. | | | C-1 | C-2 | C-3 | C-4 | C-5 | C-6 | C-7 | C-8 | C-9 | C-10 | C-11 |
|---|---|---|---|---|---|---|---|---|---|---|---|---|---|
| Aging conditions | Temperature | ° C. | 60 | 60 | 60 | 60 | 60 | 60 | 60 | 60 | | | 50 |
| | Time | day | 7 | 7 | 7 | 7 | 7 | 7 | 7 | 7 | | | 2 |
| Curing | Temperature | ° C. | 120 | 120 | 120 | 120 | 120 | 120 | 120 | 120 | 120 | 120 | 120 |

TABLE 9-continued

| Liquid composition No. | | | C-1 | C-2 | C-3 | C-4 | C-5 | C-6 | C-7 | C-8 | C-9 | C-10 | C-11 |
|---|---|---|---|---|---|---|---|---|---|---|---|---|---|
| conditions Time | Time | | 2 | 2 | 2 | 2 | 2 | 2 | 2 | 2 | 2 | 2 | 2 |
| Shrinkage test | | | 3.6 | 3.3 | 3.1 | 3.8 | 3.5 | 3.2 | 3.5 | 3.0 | 8.9 | 3.5 | 3.2 |

Table 10 shows the intermediate base material (prepreg) preparation conditions, the prepreg impregnation state, and the thickening conditions.

[Odor Evaluation of Intermediate Base Material]

The odor when the film was peeled off was confirmed. ○: No pungent odor x: With pungent odor

TABLE 10

| | | | Exa.20 | Exa.21 | Exa.22 | Exa.23 | Exa.24 | Exa.25 | Exa.26 | Exa.27 | Comparative Exa.11 | Comparative Exa.12 | Comparative Exa.13 |
|---|---|---|---|---|---|---|---|---|---|---|---|---|---|
| Prepreg No. | | | P-1 | P-2 | P-3 | P-4 | P-5 | P-6 | P-7 | P-8 | P-9 | P-10 | P-11 |
| Intermediate base material | Liquid composition (Resin) Type | | C-1 | C-2 | C-3 | C-4 | C-5 | C-6 | C-7 | C-8 | C-9 | C-10 | C-11 |
| | Liquid composition | g | 150 | 150 | 150 | 150 | 150 | 150 | 150 | 150 | 150 | 150 | 150 |
| | Fibers Type | | Carbon fiber (3k twill weave, TR3523M bmanufactured by Mitsubishi Chemical Corporation) | | | | | | | | | | |
| | Fibers Weight | | 22 g × 10 (impregnated one by one) | | | | | | | | | | 220 |
| | Impregnation temperature | °C. | 25 | 30 | 40 | 40 | 25 | 25 | 25 | 25 | 25 | 80 | 25 |
| | Aging temperature | °C. | 80 | 80 | 60 | 60 | 60 | 60 | 60 | 60 | 40 | — | 40 |
| | Aging period | day | 5 | 5 | 5 | 5 | 5 | 5 | 5 | 5 | 5 | | 2 |
| | Weight per unit area | kg/m² | 0.33 | | | | | | | | | | 3.3 |
| | State of prepreg (impregnation) | | ○ | ○ | ○ | ○ | ○ | ○ | ○ | x | ○ | x | ○ |
| | Post-aging prepreg odor | | ○ | ○ | ○ | ○ | ○ | ○ | ○ | ○ | x | ○ | ○ |

[Manufacture of Intermediate Base Material]

Manufacture of Prepreg (P-1 to 11)

The liquid compositions (C-1 to 11) shown in Table 8 were impregnated into 10 pieces of 33 cm square carbon fibers (3K twill, TR3523M manufactured by Mitsubishi Chemical Corporation) one by one with the formulation shown in Table 10, and then a prepreg was obtained by aging under each condition. The obtained prepreg had about 60% by weight of fibers.

The liquid compositions shown in Table 8 were impregnated into those of a stack of 10 sheets of 33 cm square carbon fibers (3K twill weave, TR3523M manufactured by Mitsubishi Chemical Corporation) in the formulation shown in Table 10. And then the mixture were aged under each condition to obtain a prepreg. The obtained prepreg had about 60% by weight of fibers. C-10 (Comparative Example 12) was impregnated one by one by a hot melt method, and then 10 sheets were laminated to prepare a prepreg.

Manufacture of C-SMC (S-1 to 11)

The liquid compositions (C-1 to 9 and C-11) shown in Table 8 were impregnated in to Carbon fibers (TR50S 12L manufactured by Mitsubishi Chemical Corporation) which were cut into a length of 25 mm and uniformly dispersed in a 25 cm square in the formulation shown in Table 11. And then the mixture were aged under each condition to obtain C-SMC. The obtained C-SMC had about 55% by weight of fibers. In S-10 (Comparative Example 15), after preparing a tow prepreg by a hot melt method, the prepared tow prepreg was cut to a length of 25 mm, randomly oriented, and pressed at 50° C. to obtain C-SMC.

[Evaluation of Impregnation Property of Intermediate Base Material (Prepreg, C-SMC)]

The degree of impregnation was visually confirmed. ⊚: Very good ○: Good x: Unimpregnated part

[Molding of Intermediate Base Material]

Molding of Prepreg

Using the prepared prepreg (P-1 to 11), molding was performed by a press (using a 100-ton press machine manufactured by Toho Press Mfg. Co., Ltd.) to obtain a molded sheet (Examples 20 to 27 and Comparative Examples 11 to 13). The press molding temperature was 130° C., the molding pressure was 1 MPa, and the molding time was 7 minutes.

Molding of C-SMC

Using the prepared C-SMC (S-1 to 11), molding was performed by a press (using a 100-ton press machine manufactured by Toho Press Mfg. Co., Ltd.) to obtain a molded sheet (Examples 28 to 35 and Comparative Examples 14-16). The press molding temperature was 130° C., the molding pressure was 8 MPa, and the molding time was 7 minutes.

[Measurement of Physical Properties of Molded Sheet]

The obtained molded sheet was subjected to a bending test, an interlaminar shear test, a moldability and an impregnation property test.

Bending Test

The measurement was performed by a method compliant with ASTM D 790.

Interlaminar Shear Test

The measurement was performed by a method compliant with ASTM D 2344. The results of the bending test, the interlaminar shear test, and the physical property evaluation test were shown in Tables 12 and 13.

[Chemical Resistance Test]

As a chemical resistance test, the molded product was immersed in a hydrochloric acid solution having a concentration of 10% and a sodium hydroxide solution having a concentration of 10% for 2 months, respectively. A bending test was performed after immersion, and the bending strength retention rate was measured. The test results were shown in Table 14.

As a result, it can be seen from Tables 10 and 11 that the liquid composition has an excellent impregnation property into the base material because it has a lower viscosity than the hot melt resin. Further, it can be seen from Table 9 that, as compared with the method of mixing the radically polymerizable resin and the thickener, the intermediate base material after aging has no odor, shrinkage during curing is small, and the intermediate base material is excellent in dimensional stability. You can see that it gives. Further, from Tables 12 to 14, it can be seen that the intermediate base material provides a composite material having excellent mechanical properties and excellent chemical resistance.

Table 11 shows the intermediate base material (C-SMC) preparation conditions and the impregnation state of C-SMC. In Table 11, *2 indicates that the toe prepreg (hot melt method) is prepared in advance, and then the prepreg is cut to 25 mm to form C-SMC.

TABLE 11

| | | | Exa.28 | Exa.29 | Exa.30 | Exa.31 | Exa.32 | Exa.33 | Exa.34 | Exa.35 | Comparative Exa.14 | Comparative Exa.15 | Comparative Exa.16 |
|---|---|---|---|---|---|---|---|---|---|---|---|---|---|
| Intermediate base material | C-SMC No. | | S-1 | S-2 | S-3 | S-4 | S-4 | S-6 | S-7 | S-8 | S-9 | S-10 | S-11 |
| | Luquid Composition (Resin) Type | | C-1 | C-2 | C-3 | C-4 | C-5 | C-6 | C-7 | C-8 | C-9 | C-10 | C-11 |
| | Liquid Composition (Resin) Type | g | 58 | 58 | 58 | 58 | 58 | 58 | 58 | 58 | 58 | 58 | 58 |
| | Fiber Type | | Carbon fiber bundle cut to a length of 25 mm and uniformly dispearsed (TR50S 12L manufactured by Mitsubishi Chemial Corporation) | | | | | | | | | | |
| | Fibers Weight | | 70 g | | | | | | | | | | |
| | The size of the created C-SMC | | 25 cm square | 25 cm square | 25 cm square | 25 cm square | 25 cm square | 25 cm square | 25 cm square | 25 cm square | 25 cm square | 25 cm square | 25 cm square |
| | Impregnation temperature | °C. | 25 | 30 | 40 | 40 | 25 | 25 | 25 | 25 | 25 | 80 | 80 |
| | Aging temperature | °C. | 60 | 60 | 60 | 60 | 60 | 60 | 60 | 60 | 40 | *2 | 80 |
| | Aging period | day | 5 | 5 | 5 | 5 | 5 | 5 | 5 | 5 | 5 | | 2 |
| | Weight per unit area | kg/m² | 2.0 | | | | | | | | | | |
| | State of C-SMC (impregnation) | | ○ | ○ | ○ | ○ | ○ | ○ | ○ | x | ○ | — | ○ |
| | C-SMC odor after aging | | ○ | ○ | ○ | ○ | ○ | ○ | ○ | ○ | x | ○ | ○ |

Table 12 shows the results of the bending test, the interlaminar shear test, the physical property evaluation test result, the moldability and the impregnation property test of the prepreg molded sheet.

TABLE 12

| | | Exa. 20 | Exa. 21 | Exa. 22 | Exa. 23 | Exa. 24 | Exa. 25 | Exa. 26 | Exa. 27 | Comparative Exa. 11 | Comparative Exa. 12 | Comparative Exa. 13 |
|---|---|---|---|---|---|---|---|---|---|---|---|---|
| Prepreg No. | | P-1 | P-2 | P-3 | P-4 | P-5 | P-6 | P-7 | P-8 | P-9 | P-10 | P-11 |
| Flexural strength (ASTM) | MPa | 912 | 908 | 873 | 780 | 901 | 751 | 780 | 769 | 736 | 812 | 1080 |
| Interlaminir shear strength (ASTM) | MPa | 66 | 63 | 62 | 61 | 64 | 55 | 57 | 51 | 49 | 58 | 107 |

Table 13 shows the results of the bending test, the interlaminar shear test, the physical property evaluation test result, the moldability and the impregnation property test of the C-SMC molded sheet.

TABLE 13

| | | Exa. 28 | Exa. 29 | Exa. 30 | Exa. 31 | Exa. 32 | Exa. 33 | Exa. 34 | Exa. 35 | Comparative Exa. 14 | Comparative Exa. 15 | Comparative Exa. 16 |
|---|---|---|---|---|---|---|---|---|---|---|---|---|
| C-SMC No. | | S-1 | S-2 | S-3 | S-4 | S-5 | S-6 | S-7 | S-8 | S-9 | S-10 | S-11 |
| Flexuarl strength (ASTM) | MPa | 490 | 470 | 472 | 389 | 501 | 325 | 308 | 299 | 301 | 242 | 621 |
| Interlaminar shear strength (ASTM) | MPa | 48 | 44 | 43 | 38 | 47 | 30 | 31 | 29 | 21 | 24 | 53 |

Table 14 shows the test results when the bending test was performed after immersion and the bending strength retention rate was measured.

TABLE 14

| | | Exa. 28 | Exa. 29 | Exa. 30 | Exa. 31 | Exa. 32 | Exa. 33 | Exa. 34 | Exa. 35 | Comparative Exa. 14 | Comparative Exa. 15 | Comparative Exa. 16 |
|---|---|---|---|---|---|---|---|---|---|---|---|---|
| 10% hydrochloric acid aqueous solution immersion product | % | 94 | 96 | 93 | 97 | 93 | 88 | 87 | 95 | 96 | 90 | 67 |
| 10% sodium hydroxide aqueous solution immersion product | % | 82 | 85 | 87 | 91 | 81 | 78 | 79 | 87 | 86 | 85 | 41 |

From the above results, according to the present invention using the liquid composition having excellent impregnation property, a fiber reinforced plastic intermediate base material having better impregnation property as compared with a resin for hot melt can be obtained, and the molded product by using the intermediate base material makes it possible to provide FRP having high strength and excellent FRP dimensional stability and chemical resistance.

INDUSTRIAL APPLICABILITY

Since the radical polymerizable resin composition, the liquid composition for intermediate base material, and the intermediate base material of the present invention are lightweight and have high strength, the range of application is not limited and can be used in a wide variety of ways. such as transportation equipment, industrial materials, civil engineering reinforcing materials, and sports equipment and the like.

The invention claimed is:

1. A liquid composition for a fiber reinforced plastic intermediate base material made by blending the following (A) and (B) to form a resin on fibers or woven fabrics:

(A): a composition containing a compound (a) having two or more isocyanate groups, and (B): a composition containing the following (b1) and (b3) as an essential component, and further optionally containing (b2), wherein the liquid composition, which is a mixture of the compositions (A) and (B), has a viscosity of 5 to 200 mPa·s at 10 to 50° C. measured by a B-type viscometer, (b1): an ethylenically unsaturated group containing monoalcoholic compound, (b2): a compound having two or more reactive groups with isocyanate group, (b3): a polymerization inhibitor.

2. A liquid composition according to claim 1, wherein a polymerization initiator (C) and/or a urethanization catalyst (D) is further blended with the composition (A) or (B).

3. A liquid composition described according to claim 1, wherein the reactive group with isocyanate group molar ratio (B/A) in the composition (B) to the number of moles of isocyanate groups in the composition (A) is 0.8 to 1.2.

4. A liquid composition according to claim 1, wherein the composition (A) or (B) comprises a polymerizable monomer (E) containing no reactive group with isocyanate group.

5. A liquid composition according to claim 4, wherein the content of the polymerizable monomer (E) is 0 to 40% by weight with respect to the total weight of the compositions (A) and (B).

* * * * *